(12) United States Patent
Liu

(10) Patent No.: US 12,288,435 B2
(45) Date of Patent: Apr. 29, 2025

(54) DATABASE SYSTEM FOR CONTROLLING THE GATE OF SUBWAY RIDING AREA

(71) Applicant: Jian Liu, Xi'an (CN)

(72) Inventor: Jian Liu, Xi'an (CN)

( * ) Notice: Subject to any disclaimer, the term of this patent is extended or adjusted under 35 U.S.C. 154(b) by 49 days.

(21) Appl. No.: 17/987,038

(22) Filed: Nov. 11, 2022

(65) Prior Publication Data

US 2023/0085388 A1 Mar. 16, 2023

Related U.S. Application Data

(63) Continuation of application No. PCT/CN2021/000102, filed on May 13, 2021.

(30) Foreign Application Priority Data

| May 16, 2020 | (CN) | 202010432907.0 |
| Jul. 6, 2020 | (CN) | 202010678967.0 |
| Jul. 14, 2020 | (CN) | 202010667504.4 |
| Aug. 25, 2020 | (CN) | 202010866806.4 |
| Dec. 28, 2020 | (CN) | 202011574460.7 |

(51) Int. Cl.
*G07C 9/15* (2020.01)
*G06T 7/70* (2017.01)
(Continued)

(52) U.S. Cl.
CPC .............. *G07C 9/15* (2020.01); *G06T 7/70* (2017.01); *G06V 20/53* (2022.01); *G07C 9/10* (2020.01);
(Continued)

(58) Field of Classification Search
CPC .... G07C 9/15; G07C 9/38; G07C 9/00; G06T 7/70; G06T 2207/10016;
(Continued)

(56) References Cited

U.S. PATENT DOCUMENTS

| 5,176,082 A * | 1/1993 | Chun | B61B 1/02 |
| | | | 105/341.5 |
| 8,615,338 B2 * | 12/2013 | Creissels | B61B 12/022 |
| | | | 701/19 |

(Continued)

FOREIGN PATENT DOCUMENTS

CN 101944289 A * 1/2011

*Primary Examiner* — An T Nguyen

(57) ABSTRACT

Inside a railway train, a wall or door is set between the non-restricted carriage and the restricted carriage for separation, including the instruction system, execution system and server. The said instruction system comprises a passenger counting unit, a gate instruction unit and a storage unit; the said execution system comprises a gate control unit arranged on a riding area computer at the next station; and the passenger counting unit transmits the total number of passengers that have entered the restricted carriage to the gate instruction unit. The gate instruction unit obtains the gate instruction based on the total number of passengers that have entered the restricted carriage. The gate control unit of the riding area computer at the next station also executes the gate instruction, so as to control the number of passengers that have entered the riding area within the maximum number of passengers.

10 Claims, 8 Drawing Sheets

(51) Int. Cl.
*G06V 20/52* (2022.01)
*G07C 9/10* (2020.01)
*G07C 9/38* (2020.01)

(52) U.S. Cl.
CPC ...... *G07C 9/38* (2020.01); *G06T 2207/10016* (2013.01); *G06T 2207/30196* (2013.01); *G06T 2207/30232* (2013.01); *G06T 2207/30242* (2013.01)

(58) Field of Classification Search
CPC . G06T 2207/30196; G06T 2207/30232; G06T 2207/30242; G06V 20/53; G06V 20/46; G06V 40/23; G06M 1/272; G06F 11/1448; G06F 16/2282; G06F 16/245; G06Q 50/40
See application file for complete search history.

(56) References Cited

U.S. PATENT DOCUMENTS

| | | | |
|---|---|---|---|
| 10,515,548 B2* | 12/2019 | Nagao | G06Q 50/40 |
| 10,550,622 B2* | 2/2020 | Kobler | B61B 11/00 |
| 2019/0236322 A1* | 8/2019 | Arquero | B61L 15/0045 |

* cited by examiner

DATABASE SYSTEM FOR CONTROLLING THE GATE OF SUBWAY RIDING AREA

CROSS-REFERENCE TO RELATED APPLICATIONS

This application is a continuation of International Patent Application No. PCT/CN2021/000102, filed on May 13, 2021, which claims the benefit of priority from Chinese Patent Application No. 202010432907.0, filed on May 16, 2020; Chinese Patent Application No. 202010678967.0, filed on Jul. 6, 2020; Chinese Patent Application No. 202010667504.4, filed on Jul. 14, 2020; Chinese Patent Application No. 202010866806.4, filed on Aug. 25, 2020; and Chinese Patent Application No. 202011574460.7, filed on Dec. 28, 2020. The content of the aforementioned applications, including any intervening amendments thereto, is incorporated herein by reference.

TECHNICAL FIELD

This invention relates to a computer program for controlling the gate of subway platform riding area and its application system.

BACKGROUND ART

In the prior art, counters are arranged on the entrance and exit gates of the riding area to count the number of passengers that have entered the riding area. When the number of passengers that have entered the riding area of one platform reaches the maximum number of passengers, the gate for entering the riding area of the next station will be closed, which fails to achieve the purpose of accurately controlling the passengers that have entered a station. The maximum number of passengers is the same for each vehicle in the riding areas of all platforms and is a fixed constant maximum number of passengers, referred to as the maximum number of passengers.

CONTENTS OF THE INVENTION

A database system for controlling the gate of subway riding area comprises a railway train. The said railway train is composed of carriages with non-restricted number of passengers and carriages with restricted number of passengers. The carriages with non-restricted number of passengers are hereinafter referred to as non-restricted carriages; the carriages with restricted number of passengers are hereinafter referred to as restricted carriages; and the restricted carriage is a carriage with a constant maximum number of passengers. The constant maximum number of passengers is referred to as the maximum number of passengers, i.e. the maximum number of passengers that can be carried in a restricted carriage. There is a wall or door arranged between the non-restricted carriage and restricted carriage for separation. The riding area for a non-restricted carriage is located in the middle of the platform, and that for a restricted carriage is located at one or both ends of the platform. The platform is provided with riding area entry and exit gates as well as fences to divide the platform into non-restricted carriage riding area and restricted carriage riding area. The restricted carriage riding area is hereinafter referred to as the riding area;

CHARACTERISTICS OF THIS INVENTION

This invention comprises an instruction system, an execution system and a line server, wherein the line server is hereinafter referred to as the server. The said instruction system comprises a gate instruction unit that is composed of a passenger counting unit, a gate instruction subunit and a storage unit. The said execution system comprises a gate control unit arranged on a computer in the riding area of the next station.

The said passenger counting unit is designed to record the total number of passengers that have entered the restricted carriage from a train's arrival time to the departure time. This unit is connected to the gate instruction unit, The passenger counting unit transmits the total number of passengers that have entered the restricted carriage to the gate instruction subunit. The gate instruction subunit obtains the gate instruction based on the total number of passengers that have entered the restricted carriage. The gate instruction unit connects and transmits the gate instruction to the gate control unit arranged on a computer in the riding area of the next station.

The function of the gate control unit arranged on a computer in the riding area of the next station includes executing the said gate instruction to ensure that the number of passengers that have entered the riding area reaches up to the maximum number of passengers.

The said instruction system comprises a computer, an on-board computer or a server arranged in the riding area.

The said passenger counting unit comprises a vehicle arrival and departure sensor, a restricted carriage entry passenger counter, a restricted carriage exit passenger counter and a passenger counting subunit.

The said passenger counting unit is designed to calculate the total number of passengers that have entered the restricted carriage from the time when the door opens to the time when it closes (which is referred to as the total number of passengers that have entered the restricted carriage) based on the number of passengers (transmitted by the restricted carriage entry passenger counter) that have entered the restricted carriage from the time when the door opens to the time when it closes as well as the total number of passengers (transmitted by the restricted carriage exit passenger counter) that have exited the restricted carriage from the time when the door opens to the time when it closes. The total number of passengers that have entered the restricted carriage=the number of passengers that have entered the restricted carriage from the time when the door opens to the time when it closes–the number of passengers that have exited the restricted carriage from the time when the door opens to the time when it closes. The total number of passengers that have entered the restricted carriage from the time when the door opens to the time when it closes shall be transmitted to the gate instruction subunit.

The said restricted carriage entry passenger counter, the restricted carriage exit passenger counter and the passenger counting subunit include a video passenger flow counter.

The said video passenger flow counter is designed to record the number of passengers that have entered the restricted carriage, the number of passengers that have exited the restricted carriage, and the total number of passengers that have entered the restricted carriage, and to transmit the total number of passengers that have entered the restricted carriage to the gate instruction subunit, and to store the number of passengers that have entered the restricted carriage in the Table of Passengers that Have Entered the Restricted Carriage of the storage unit. This is a video passenger flow counter-type passenger counting unit, referred to as passenger counting unit for short, which includes the door sensor connected to the video passenger flow counter.

The said video passenger flow counter includes the upper part of the platform corresponding to the parking position of the carriage door of the restricted carriage in the riding area, or the upper part of the position corresponding to the door of the restricted carriage in the carriages.

The said storage unit stores the original number and the preset number of passengers. The original number of passengers is the number of passengers in the restricted carriage before the door opening time of the carriage in the station while the preset number is the preset number of passengers that will enter the riding area of the next station.

The said gate instruction unit includes a gate instruction algorithm, and the function of the said gate instruction algorithm includes a gate instruction sent to the execution system of a computer in the riding area of the next station according to the existing number of passengers and a preset number.

The said gate instruction algorithm includes calling out the original number of passengers and the preset number from the storage unit to obtain the existing number of passengers. The said existing number of passengers is the total number of passengers in the restricted carriage at the time when the door closes, and the existing number of passengers=the total number of passengers that have entered the restricted carriage from the time when the train arrives to the time it departs+the original number of passengers. It further includes the number of passengers allowed to enter the riding area of the next station according to the existing number of passengers, the restricted number of passengers and the preset number, which is referred to as the allowable number of passengers for short. The allowable number of passengers=the existing number of passengers–the maximum number of passengers–the preset number; among them, the maximum number of passengers+the preset number is a variable, also known as the flexible maximum number of passengers.

The said gate instruction algorithm further includes storing the existing number of passengers in the storage unit as the original number of passengers for the vehicle in the riding area of the next station.

The said gate instruction algorithm stores the existing number of passengers of the ID vehicle in the ID riding area into the original number of passengers of the ID vehicle in the ID riding area of the next station in the Riding Area Operation Table or the Vehicle Operation Table, which is used as the base for the gate instruction unit to calculate the existing number of passengers of the ID vehicle in ID riding area of the next station. The riding area in the riding area number is indicated by the ID riding area, and the vehicle in the vehicle number is indicated by the ID vehicle.

The said gate instruction algorithm transmits the allowable number of passengers to the gate control unit in the riding area of the next station, and instructs that when the number of passengers that have entered the riding area of the next station as recorded by the counter reaches the allowable number of passengers, the gate control unit of the riding area will close the gate for entering the riding area of the next station.

The said storage unit stores the Riding Area Operation Table or the Vehicle Operation Table, and these two tables contain the original number of and the preset number of passengers.

The said instruction system further comprises a display screen instruction unit, whose function is to connect the display screen control module to display the allowable number of passengers obtained by the gate instruction unit on the display screen.

The said railway train comprises the formation of railway train whose length exceeds the platform, and the non-restricted carriage includes the carriage in the platform, which stops in the middle of the platform; the restricted carriage includes waiting carriages and carriages outside the station; the waiting carriage stops at the inner side of both ends of the platform; and the carriage outside the station stops outside the platform.

The restricted carriage entry passenger counter is designed to record the number of passengers that have entered the restricted carriage, and the restricted carriage exit passenger counter is designed to record the number of passengers that have exited the restricted carriage. The passenger counting subunit is designed to count the number of passengers that have entered the restricted carriage and the total number of passengers that have entered the restricted carriage.

The said vehicle arrival and departure sensors include a door sensor. The opening of the door indicates a train's arrival, and the closing of the door indicates a train's departure. The vehicle arrival and departure sensors are hereinafter referred to as door sensors.

The door sensors are connected to the restricted carriage entry passenger counter and the restricted carriage exit passenger counter. The restricted carriage entry passenger counter is connected to the passenger counting subunit, and the restricted carriage exit passenger counter is connected to the passenger counting subunit. See functions of 7, 8, 9, 11, 18, 19, 20, 22, and 39, 41, 42, 43 in FIG. 7.

The said restricted carriage entry passenger counter is designed to record the number of passengers that have entered the restricted carriage, and the said restricted carriage exit passenger counter is designed to record the number of passengers that have exited the restricted carriage.

When the door is opened, the door sensor sends the door opening signal to the restricted carriage entry and exit passenger counters, so that these sensors begin to record the number of passengers that have entered and exited the restricted carriages.

When the door is closed, the door sensor sends the door closing signal to the restricted carriage entry and exit passenger counters. The restricted carriage entry and exit passenger counters finish recording the number of passengers that have entered or exited the restricted carriages, and transmit the number of passengers that have entered or exited the restricted carriages to the passenger counting subunit. Then, the passenger counting subunit records the number of passengers that have entered the restricted carriages and the total number of passengers that have entered the restricted carriages transmits the total number of passengers that have entered the restricted carriage to the instruction unit, and stores the number of passengers that have entered the restricted carriage in the Table of Passengers that Have Entered the Restricted Carriage of the storage unit.

The said door sensor are designed to sense the train arriving at or departing from the platform, and transmit the signal of the train arriving at the platform to the restricted carriage entry and exit passenger counters when the train arrives at the platform, and transmit the signal of the train departing from the platform to the restricted carriage entry and exit passenger counters when the train departs from the platform.

The said door sensors described below in this document include those arranged in a riding area at the corresponding position of the door of the restricted carriage or at the position corresponding to the door of the restricted carriage.

The said door sensors comprise a door photoelectric switch. The light of the said door photoelectric switch is aligned at the door. The opening of the carriage door indicates the train arrives at the riding area, and the closing of the carriage door indicates the train departs from the riding area. When the door is opened, the door photoelectric switch transmits the door opening signal to the restricted carriage entry and exit passenger counters; when the door is closed, the door photoelectric switch transmits the door closing signal to the restricted carriage entry and exit passenger counters.

The said passenger counting subunit is designed to record the total number of passengers that have entered the restricted carriage.

The functions of the said restricted carriage entry and exit passenger counters and the passenger counting subunit include the function of the video passenger flow counter.

The said video passenger flow counter includes recording the number of passengers that have entered the riding area and the total number of passengers that have entered the riding area, and providing a gate instruction unit.

The said video passenger flow counter includes a dynamic video passenger counter, referred to as a video passenger counter for short. The function of the video passenger counter includes recording the number of passengers that have entered the restricted carriage, the number of passengers that have exited the restricted carriage and the total number of passengers that have entered the restricted carriage in a certain time period.

The function of the said passenger counting unit further includes transmitting the number of passengers that have entered the restricted carriage from the time when the door opens to the time when it closes to the Table of Passengers that Have Entered the Restricted Carriage of the storage unit, as shown in Table 7.

The said passenger counting unit is connected with the gate instruction unit; the gate instruction unit is connected to the gate control unit in the riding area of next station; and the connection mode includes wired or wireless mode.

The said preset number is the number of passengers allowed to enter the riding area of next station, which is preset or preset based on big data according to a certain rule; in this document, the server calculation unit uses the big data of several consecutive weeks as shown in the database Table of Passengers that Have Entered the Restricted Carriage (namely, the average number of passengers that have entered the restricted carriage in the ID riding area of the next station with the operation sequence and within the parking time of the ID vehicle parked in the ID riding area) as the preset number of such ID vehicle in the ID riding area of the next station with the same operation sequence and within the same parking time.

In this document, the average number of passengers that have entered the restricted carriages of vehicles with the same parking sequence, the same parking time, and the same ID in the next station in consecutive weeks and with the same week name as calculated by the server calculation unit based on database Table of Passengers that Have Entered the Restricted Carriage is taken as the preset number of such vehicle with the same ID in the same ID riding area of the next station. See Example 3.

The said storage unit contains the Table of Allowable Number of Passengers or the Table of Passengers that Have Entered the Restricted Carriage.

The said passenger counting unit is used to transmit the number of passengers that have entered the restricted carriage to the Table of Passengers that Have Entered the Restricted Carriage in the storage unit from the time the vehicle opens the door at this platform to the time it closes the door. At the end of the daily operation, the computer in the riding area and the on-board computer will upload the table to the server database as the base for calculating the preset number.

The said passenger counter comprises a video passenger flow counter, a mechanical passenger counter, an infrared passenger counter and an infrared counter. The said video passenger flow counter contains a static video passenger flow counter and a dynamic video passenger flow counter, and the said dynamic video passenger flow counter is referred to as a video passenger flow counter for short. The said video passenger flow counter further comprises a 2D video passenger flow counter and a binocular 3D video passenger flow counter.

The video passenger flow counter includes the riding area gate entry counter and the riding area gate exit counter. It can provide the instruction unit with the number of passengers that have entered the riding area from the time when the door opens to the time when it closes or the total number of passengers that have entered the riding area from the time when the door opens to the time when it closes.

The total number of passengers that have entered the riding area from the time when the door opens to the time when it closes=the number of passengers that have entered the riding area from the time when the door opens to the time when it closes as recorded by the riding area gate entry counter−the number of passengers that have entered the riding area from the time when the door opens to the time when it closes as recorded by the riding area gate exit counter.

The said video passenger counter includes a static video passenger counter that records the number of passengers in an area at an instantaneous time, and the instantaneous time includes 0.2-0.5 seconds. The said static video passenger flow counter is designed to record the number of passengers in a certain area at a certain time (e.g. when the door is open, or when it is closed).

The said passenger counting unit comprises a gate type passenger counting unit, the said gate type passenger counting unit comprises a passenger counter arranged at the platform riding area entry gate (referred to as riding area gate entry counter) and a passenger exit counter arranged at the platform riding area exit gate (referred to as the riding area gate exit counter). The said riding area gate entry counter records the number of passengers that have entered the riding area, and the said riding area gate exit counter records the number of passengers that have exited the riding area. A static video passenger flow counter is arranged within the riding area and is used to record the number of passengers within the riding area at the time when the door is opened, or when the door is closed. See functions of 7-11 and 18-22 in FIG. 7.

The said passenger counting unit comprises a gate type passenger counting unit. The said gate type passenger counting unit comprises a static passenger flow counter, a riding area gate entry passenger flow counter, and a riding area gate exit passenger flow counter that are connected to the door sensor and arranged within the riding area at upper part of the riding area. The said static passenger flow counter within the riding area at upper part of the riding area is designed to record the number of passengers within the riding area at the time when the door opens or when it closes, and the said riding area gate entry passenger counter is designed to record the number of passengers that have entered the gate of the riding area from the time when the door opens to the time when it closes. The riding area gate exit passenger flow counter is designed to record the number of passengers that have exited the gate of the riding area from the time when the door opens to the time when it closes. The said passenger flow counter is referred to as the counter for short.

The method for the said gate type passenger counting unit to record the total number of passengers that have entered the restricted carriage from the time when the door opens to the time when it closes is described below:

The total number of passengers that have entered the restricted carriage from the time when the door opens to the time when it closes=the number of passengers in the riding area recorded by the static video passenger flow counter within the riding area at the time when the door opens−the number of passengers in the riding area recorded by the static video passenger flow counter within the riding area at the time when the door is closed+the number of passengers that have entered the riding area from the time when the door opens to the time when it closes as recorded by the riding area gate entry counter−the number of passengers that have exited the riding area from the time when the door opens to the time when it closes as recorded by the riding area gate exit counter.

The said door sensor is coiled in the riding area gate entry counter and out of the riding area gate exit counter, and then connected to the static video passenger flow counter within the riding area.

The said riding area gate entry counter is coiled in the passenger counting subunit. The said riding area gate exit counter is connected to the passenger counting subunit. The said static video passenger flow counter within the riding area is connected to the passenger counting subunit.

The said gate type passenger counting unit is coiled in the gate instruction unit. When the door sensor sends a closing instruction, the riding area gate entry counter transmits the number of passengers that have entered the riding area from the time when the door opens to the time when it closes to the passenger counting subunit, and the riding area gate exit counter transmits the number of passengers that have exited the riding area from the time when the door opens to the time when it closes to the passenger counting subunit.

The said static video passenger flow counter within the passenger area is coiled in the passenger counting subunit. When the door sensor sends the door opening instruction, the number of passengers within the riding area shall be recorded and transmitted to the passenger counting subunit; the said gate type passenger counting unit is coiled in the gate instruction subunit of the computer in the riding area, and transmits the total number of passengers that have entered the riding area from the time when the door opens to the time when it closes to the instruction unit, as shown in FIG. 1.7.8.

The said gate instruction unit stores the allowable number of passengers in the Table of Allowable Number of Passengers in the computer in the riding area, on-board computer or server as the base for calculating and correcting the allowable number of passengers, and clears the table at then end of the daily operation.

The said computer in the riding area, the on-board computer or the server comprises a wireless communication unit, and carries out information communication with each other through the wireless network.

The control unit of the computer in the said riding area includes the riding area gate entry counter that is connected with the gate control unit. The said riding area gate entry counter is designed to record the number of passengers that have entered the riding area after the door closing time when the last train departs from the riding area, and to transmit the real-time number of passengers that have entered the riding area to the control unit of the computer in the riding area. When the number of passengers that have entered the riding area as recorded by the riding area gate entry counter reaches the allowable number of passengers or the corrected allowable number of passengers, the gate control unit in the riding area that is coiled in the industrial control module will close the gate in the riding area, so as to control the number of passengers that have entered the carriage with restricted number of passengers to a level at the maximum number of passengers.

The said instruction system comprises an instruction unit for correcting the allowable number of passengers. The said instruction unit for correcting the allowable number of passengers is designed to send an instruction for correcting the allowable number of passengers to the execution system of the computer in the riding area of the next station.

The said instruction system includes the instruction unit, which is designed to correct the allowable number of passengers. The total number of passengers counting subunit of the waiting carriage is designed to record the total number of passengers in the waiting carriage, and to transmit the total number of passengers in the waiting carriage to the instruction unit, to correct the allowable number of passengers. The instruction unit for correcting the allowable number of passengers queries the allowable number of passengers from the Table of Allowed Passengers and calculates the corrected allowable number of passengers. Corrected allowable number of passengers=total number of passengers in a waiting carriage−allowable number of passengers;

The instruction unit for correcting the allowable number of passengers transmits the corrected allowable number of passengers to the gate execution unit of the riding area execution system at the next station in real time or at different time.

(1) The real-time transmission mode is that the instruction unit for correcting the allowable number of passengers records the real-time number of passengers who have gotten off from the train at the next station according to the video passenger flow counter, obtains the corrected allowable number of passengers, and transmits the corrected allowable number of passengers to the gate execution unit of the riding area execution system at the next station.

(2) The time-specific transmission mode includes the gate execution unit that transmits the corrected allowable number of passengers to the gate execution unit of the riding area execution system at the next station according to the $1^{st}$ agreed time, the $2^{nd}$ agreed time and the $n^{th}$ agreed time.

The instruction unit for correcting the allowable number of passengers transmits the corrected allowable number of passengers to the gate execution unit of the riding area execution system at the next station at the $1^{st}$ agreed time, the $2^{nd}$ agreed time, and the $n^{th}$ agreed time until the door at the next station opens;

About the $1^{st}$ agreed time, the $2^{nd}$ agreed time and the $n^{th}$ agreed time At the $1^{st}$ agreed time, the instruction unit for correcting the allowable number of passengers transmits the corrected allowable number of passengers to the riding area correct unit at the next station; the $1^{st}$ agreed time is set as 50 seconds after the time when the door closes, The $2^{nd}$ agreed time is every other agreed time after the $1^{st}$ agreed time; an agreed time can be set as 10 seconds, and the instruction unit for correcting the allowable number of passengers sends the instruction for correcting the allowable number of passengers to the riding area execution unit at the next station, . . . .

The $n^{th}$ agreed time is n×10 seconds, and the instruction unit for correcting the allowable number of passengers sends the instruction for correcting the allowable number of passengers to the riding area execution unit at the next station;

In this way, it will cycle to the next riding area, and the door will open.

The instruction unit for correcting the number of passengers transmits the corrected number of passengers to the riding area execution unit at the next station. The riding area execution unit at the next station displays the new real-time allowable number of passengers on the display screen. When the number of passengers that have entered reaches the corrected number of passengers, the gate for entering the riding area will be closed.

When the number of passengers that have entered the riding area reaches the corrected allowable number of passengers, the gate execution unit will close the entry gate. The corrected allowable number of passengers further includes the corrected real-time allowable number of passengers. In specific implementation, the corrected allowable number of passengers is added to the real-time allowable number of passengers. The corrected real-time allowable number of passengers=the corrected allowable number of passengers+the number of passengers allowed to enter the riding area in real time;

That is, the new real-time allowable number of passengers=the real-time allowable number of passengers+the corrected allowable number of passengers;

There are two modes to calculate the total number of passengers in a waiting carriage:

(1) The said instruction unit for correcting the allowable number of passengers structurally include: where only the simple mode of a static video passenger flow counter within the waiting carriage is adopted: the static video passenger flow counter within the waiting carriage is referred to as the static video passenger flow counter of the waiting carriage, which is designed to calculate the number of passengers within the scope of the waiting carriage; that is, a static video passenger flow counter is arranged at the upper part of the waiting carriage, which is used to record the instantaneous number of passengers within the waiting carriage;

The total number of passengers in the waiting carriage=the instantaneous number of passengers within the waiting carriage sent from the static video passenger flow counter at the $1^{st}$ agreed time, (2) The said instruction unit for correcting the allowable number of passengers structurally comprises: where the mode of a static video passenger flow counter within the waiting carriage and a video passenger flow counter arranged on the carriage door outside the entry and exit station: the video passenger flow counter arranged on the carriage door outside the entry and exit station is referred to as the carriage video passenger flow counter outside the station;

The total number of passengers in the waiting carriage=the instantaneous number of passengers within the waiting carriage as recorded by the static video passenger flow counter at the time when the door closes+the number of passengers that exited the station from the time when the door closes to the $1^{st}$ agreed time as received from the carriage video passenger flow counter outside the station at the time when the door closes, as shown in FIG. 5;

The said instruction unit for correcting the allowable number of passengers includes sending the instruction for correcting the allowable number of passengers to the platform computer at the next station: the instruction for correcting the allowable number of passengers is designed to obtain the corrected allowable number of passengers based on the algorithm for correcting the allowable number of passengers, The riding area gate execution unit of the platform computer at the next station will release and allow passengers to enter the riding area based on the new allowable number of passengers. When the number of passengers that have entered the riding area reaches the new allowable number of passengers, the riding area gate will be closed.

It further includes the display screen instruction for correcting the allowable number of passengers: the said display screen instruction for correcting the allowable number of passengers comprises the display screen execution unit of the riding area at the next station that displays in real time the new allowable number of passengers on the display screen.

The said instruction unit for correcting the allowable number of passengers further includes the display screen instruction for correcting the allowable number of passengers: the display screen instruction for correcting the allowable number of passengers is designed to instruct the display screen execution unit of the riding area at the next station to display the corrected allowable number of passengers on the display screen.

The said display screen comprises an LAD display screen; the said display screen displays the allowable number of passengers or the corrected allowable number of passengers that have entered the riding area.

A display screen is arranged in the riding area, which is connected with the display screen control unit of the computer in the riding area; the display screen control unit is designed to execute the display screen instruction issued by the display screen instruction unit of the previous station, and to display the allowable number of passengers on the display screen; the said display screen comprises an LAD display screen; the said display screen displays the allowable number of passengers or the corrected allowable number of passengers that have entered the riding area.

The server comprises a computing system, an instruction system and a database.

The said riding area comprises a closed riding area connected by the barrier, the entry gate and the exit gate, and the entry gate is coiled in the gate control unit of the riding area computer; it comprises the passenger flow counters arranged at the entry and exit gates of the riding area.

The server comprises an instruction system, a computing unit and a database; the server includes a dedicated server or a cloud server.

The server computing unit includes formulating the riding area number, and the said riding area number involves the natural arrangement of the sequence of the platform riding areas operating along the whole line in the form of connecting the starting station-the terminal station of the upline with the starting station-the terminal station of the downline, wherein the natural sequence number of each platform is referred to as the platform number; or the number of the riding area.

The number of any riding area is represented by the zn riding area number, and the nearest riding area number connected by any riding area number in the forward direction is represented by the zn+1 riding area number, or the next riding area number; the nearest riding area number connected by any riding area number in the reverse direction is represented by the zn−1 riding area number, or the previous riding area number.

The server computing unit includes formulating the vehicle number. The said vehicle number includes the reference riding area. The said reference riding area is the riding area of the platform with the largest number of large and small routings in the whole line, that is, the riding area of the platform with the smallest interval between trains; each train shall be arranged naturally in the reference riding area according to the parking sequence from the beginning of operation to the end of operation, wherein, the natural sequence number of each train is referred to as the train number, and the number of carriages A and B is obtained by adding the number of carriages A and B after the train number; each vehicle number has a unique mark, which is represented by ID vehicle number, and referred to as the carriage number or ID vehicle; the vehicle number is included in the arrival time of the riding area number.

Any vehicle number is represented by vehicle number cn, the nearest vehicle number connected by any vehicle number in the forward direction is represented by vehicle number cn+1, or referred to as the previous vehicle number, and the nearest vehicle number connected by any vehicle number in the reverse direction is represented by vehicle number zn−1, or referred to as the next vehicle number.

The said connection mode: the platform number in the train timetable is renamed as the riding area number; as a platform is divided into two riding areas (the front one and the rear one). The riding area number is further divided into number of riding area A and number of riding area B; the riding area with a riding area number is indicated by ID riding area.

The said connection mode: the train number in the train timetable is renamed as the vehicle number; as a vehicle is divided into two restricted carriages (the front one and the rear one). The vehicle number is further divided into vehicle number A and vehicle number B; the vehicle with a vehicle number is indicated by ID vehicle.

When the operation center transmits the new riding area number to the computing unit of the server, and the computing unit of the server receives the new riding area number, the adjacent riding area sequence number corresponding to the location of the new riding area number will be used as the reference riding area number; the extension number of the reference riding area number shall be taken as the riding area number of the new riding area; the parking time of each vehicle number in the reference riding area shall be extended as the reference value of the parking time of the number of the corresponding vehicle parked in the new riding area; the number of the riding area as well as the parking time of the corresponding vehicle in the riding area shall be included in the Riding Area Operation Table; the parking time of the vehicle in other riding area numbers shall be changed in sequence; on the contrary, when the number of the riding area is deleted, the number of the riding area is deleted in the Riding Area Operation Table, and the parking time and preset number of other riding area numbers are changed in sequence.

When the operation center transmits the new vehicle number, parking time and routing number to the computing unit of the server, and the computing unit of the server receives the new vehicle number, the adjacent vehicle number with the same routing number corresponding to the parking time and location of the new vehicle number will be used as the reference vehicle number; the extension number of the reference vehicle number will be used as the vehicle number parameter of the new vehicle; the preset number, parking time and routing number of the reference vehicle in each riding area number shall be extended as the parameters of the preset number, parking time and routing number of the corresponding riding area number where the new vehicle is parked; and the vehicle number as well as the corresponding preset number, parking time and routing number of the vehicle shall be included in the Vehicle Operation Table; the preset number, parking time and routing number of other vehicle numbers shall be changed in sequence; on the contrary, when a vehicle is deleted, the number of the deleted vehicle will be deleted from the Vehicle Operation Table.

The said server connects with the operation center, which transmits the train timetable to the computing unit of the server. The function of the computing unit of the server is to formulate the Riding Area Operation Table or the Vehicle Operation Table according to the train timetable; and to formulate the preset number based on the average number of the Table of Passengers that Have Entered the Restricted Carriage.

The said storage unit stores the riding area operation table, the vehicle operation table, the gate instruction algorithm, and the display screen instruction algorithm.

The Riding Area Operation Table includes: table index number: riding area number, and table contents: vehicle number, arrival sequence of vehicles, time of vehicle arriving at the platform, original number of passengers, and preset number.

The Vehicle Operation Table includes: table index number: vehicle number, table contents: riding area number, arrival sequence of vehicles, time of vehicle arriving at the platform, original number of passengers, and preset number.

The unique mark in this document is indicated by ID; ID riding area is referred to as the riding area for short; ID riding area operation table is referred to as the riding area operation table for short; ID riding area computer is referred to as the riding area computer for short; ID vehicle is referred to as the vehicle for short; ID vehicle operation table is referred to as the vehicle operation table; ID vehicle computer is referred to as the vehicle computer for short;

The database stores the general table of riding area operation, that is, the Riding Area Operation Table containing the number of each riding area, as shown in Table 1, and the index of the General Table of Riding Area Operation containing the number of all riding areas, as shown in Table 2; or the general table of vehicle operation, that is, the Vehicle Operation Table containing each vehicle number, as shown in Table 3, and the index of the General Table of Vehicle Operation containing all vehicle numbers, see Table 4; used for server instruction unit retrieval, query, and the location of the riding area operation table of a riding area in the database;

The storage unit of each on-board computer stores the vehicle operation table of the vehicle number, and the storage unit of each riding area computer stores the riding area operation table of the riding area number.

At the end of each day's operation time, the riding area computer or on-board computer will report the daily riding area operation table or vehicle operation log to the server as redundancy and backup, or as big data for formulating the future riding area operation table or vehicle operation table;

After each gate instruction sends out the allowable number of passengers, the allowable number of passengers will be stored in the Table of Allowable Number of Passengers of the day in the riding area computer or the on-board computer, as shown in Table 5 and Table 6, or the riding area computer will transmit the table to the on-board computer as the basis for calculating and correcting the allowable number of passengers;

When each passenger counting unit stores the number of passengers that have entered the restricted carriages in the Table of Passengers that Have Entered the Restricted Carriage of the day in the riding area computer or the on-board computer, as shown in Table 7, or at the end of the daily operation time, the riding area computer or the on-board computer reports the log of the table to the server for redundancy and backup, or as big data for calculating the preset number.

Each riding area or vehicle must register in the table before entering into operation; if not, it cannot enter into operation. When the riding area or vehicle changes from the standby status to the operation status, the registration number of the riding area in the Riding Area Registration Table (see Table 11) or the vehicle registration number in the Vehicle Registration Table (see Table 12) of the riding area will change to the number of the riding area in the Riding Area Operation Table or the vehicle number in the Vehicle Operation Table; on the contrary, it is also true to change from the operation status to the standby status. Each vehicle has a unique number, and the unique number is represented as the ID vehicle number; each riding area has a unique number, and the unique number is represented as the ID riding area number;

The defect of the prior art is that the entry and exit gates of the riding area are equipped with counters to count the number of passengers that have entered the riding area, but the number of passengers that have entered the restricted carriage is not accurately counted. If there are passengers who have entered the riding area but do not board the train, or passengers who have gotten off from the train but do not exit the riding area immediately, resulting in inaccurate and wrong number of passengers. Therefore, the prior art does not accurately count the number of passengers that have entered the restricted carriage, and the purpose of accurately controlling passengers that have entered the riding area at the next station has not been achieved. For this technology, a video passenger flow counter is provided on the platform or carriage corresponding to the door of the restricted carriage, which can accurately count the number of passengers that have entered the restricted carriage, so as to accurately control the number of passengers that have entered the riding area at the next station.

It further includes the flexible restricted number of passengers. The said flexible restricted number of passengers=the restricted number of passengers+the preset number, so the said flexible restricted number of passengers is a variable;

The defects of the prior art are: (1) When the number of passengers that have entered the riding area of a platform reaches the maximum number of passengers, the gate for entering the riding area of the next station will be closed. In such case, passengers that get off at the next station will leave space for more passengers, but no passengers can enter the next station to make up for the vacancy in real time, resulting in a waste of utilization rate of carriages outside the station. (2) The maximum number of passengers set for the counter at the gate of the riding area is not related to the train timetable, which makes it impossible to accurately define the number of boarding passengers on large and small routing trains and at different platforms. The above two points make it difficult to use the prior art. This method (1) uses the preset number algorithm. The preset number changes the number of restricted passengers of the prior art, which remains unchanged, to a number, which can be changed according to different platform riding areas; i.e. change the restricted number of passengers from a constant to a variable, that is, the flexible maximum number of passengers to improve the utilization rate of carriages outside the station; (2) The server computing unit converts the Train Timetable into the Riding Area Operation Table or the Vehicle Operation Table in real time, and is able to determine the number of passengers that have entered the riding area in real time according to the increase or decrease of trains, so as to prevent confusion of passengers getting on and off due to the increase or decrease of trains and the ambiguity of large and small routing vehicles. (3) The fact is that the average number of passengers getting on and off the train at different platforms is different, the number of passengers at transfer stations is large, and the number of passengers at non-transfer stations is small. In order to accurately release the number of passengers entering the next station in advance, the control unit of the riding area at the next station needs to release according to the average number of passengers when the train is running from one platform to the next. By doing so, the number of passengers entering the riding area and getting on the train at different platforms can be accurately controlled. Therefore, the preset number algorithm, the method of releasing according to the average number of passengers getting on and off the train is adopted, so as to reduce the waste of the utilization rate of carriages outside the station due to more passengers getting off the train and fewer passengers getting on the train, and reduce the severity of crowding in the riding area due to fewer passengers getting off the train and more passengers getting on the train. Therefore, the algorithm of preset number is provided:

About the algorithm (method) for calculating the preset number of server computing unit:

This document temporarily sets the weekend (i.e. 24:00 on Sunday) as the time for the server computing unit to calculate the preset number; the statistical time period of the General Table of Passengers that Have Entered Restricted Carriage is from Monday to Sunday as a statistical unit; calculation will be made once a week, and the old General Table of Passengers that Have Entered Restricted Carriage will be replaced in sequence; for the preset number, the average number of passengers that have entered the restricted carriage every three weeks shall be taken as the new preset number;

Take the General Table of Passengers that Have Entered Restricted Carriage as an example, and let us see how the server computing unit calculates the preset number in the case of "Monday, 8A riding area number, 6A vehicle number, vehicle arrival sequence is 56, time of vehicle arriving at the platform is 8:00, and the routing number is a large routing number";

At 24:00 on Sunday, the server computing unit queries from the General Table of Passengers that Have Entered Restricted Carriage and obtains the table index number of Monday, the Table of Passengers that Have Entered Restricted Carriage of 8A riding area, and further queries the table "6A vehicle number, vehicle arrival sequence is 56, time of vehicle arriving at the platform is 8:00, and routing number is large routing number"; at the same time, it queries the "Table of Passengers that Have Entered Restricted Carriage" of Monday 8A riding area number for three consecutive weeks; selects the "number of passengers that have entered restricted carriage" for three consecutive weeks to obtain a new preset number. The new preset number=the sum of the number of passengers that have entered the restricted carriage for three consecutive weeks÷3;

The server computing unit adds the new preset number to the Riding Area Operation Table or the Vehicle Operation Table to replace the old preset number; in the same way, calculate the new preset number of all riding area numbers, all vehicle numbers, arrival sequence, time of vehicle arriving at the platform, and routing number; add the new preset number to the General Table of Riding Area Operation or the General Table of Vehicle Operation, and replace the old preset number; complete the calculation of new preset number.

TABLE 1

Riding Area Operation Table of ID Riding Area; table index number: ID riding area; Time: Week . . . , Month, Day, Year

| Vehicle No. | Vehicle arrival sequence | Time of vehicle arriving at the platform | Original number of passengers | Routing number | Preset number |
|---|---|---|---|---|---|
| C1 Vehicle No | 1 | 6.00 | . . . | . . . | . . . |

The Riding Area Operation Table will be stored in the riding area computer storage unit of the sequence number of the ID riding area, which shall be used as the instruction unit of the riding area computer for query.

TABLE 2

Index to General Table of Riding Area Operation

| The directory name is the table index number | Location of general table of riding area operation |
|---|---|
| Operation Table of Z1A Riding Area | . . . |

That is, the General Table of Riding Area Operation is composed of the index to the General Table of Riding Area Operation and the Riding Area Operation Table, and is stored in the database as the server instruction unit for query.

TABLE 3

Vehicle Operation Table of ID vehicle, table index number: ID vehicle (routing number); Time: Week . . . , Month, Day, Year

| Riding area number | Arrival sequence | Time for arrival at the riding area | Original number of passengers | Preset number |
|---|---|---|---|---|
| Z1 riding area number | . . . | . . . | . . . | . . . |

The Vehicle Operation Table is stored in the on-board computer storage units of ID vehicle and used as the on-board computer instruction unit for query.

TABLE 4

Index to General Table of Vehicle Operation:

| The directory name is the table index number | Location of general table of vehicle operation |
|---|---|
| C 1A vehicle operation table | . . . |

That is, the General Table of Riding Area Operation is composed of the index to the General Table of Vehicle Operation and the Vehicle Operation Table, and is stored in the database as the server instruction unit for query.

TABLE 5

Table of Allowable Number of Passengers in a Riding Area for ID Riding Area, referred to as Table of Allowable Number of Passengers in a Riding Area for short; table index number: ID riding area; Week . . . , Month, Day, Year

| Vehicle No. | Vehicle arrival sequence | Time of vehicle arriving at the platform | Allowable number of passengers | Routing number |
|---|---|---|---|---|
| C1 Vehicle No | 1 | 6.00 | . . . | . . . |

TABLE 6

Table of Allowable Number of Passengers in a Vehicle for ID Vehicle is referred to as Table of Allowable Number of Passengers in a Vehicle for short: table index number: ID vehicle; (routing number . . .) Week . . . , Month, Day, Year

| Riding area number | Arrival sequence | Time for arrival at the riding area | Allowable number of passengers |
|---|---|---|---|
| Z1 riding area number | . . . | . . . | . . . |

TABLE 7

Table of Passengers that Have Entered Restricted Carriage in a Riding Area for ID Riding Area, referred to as Table of Passengers that Have Entered Restricted Carriage in a Riding Area for short; table index number: ID riding area; (Log: week . . . , Day, Month, Year)

| Vehicle No. | Vehicle arrival sequence | Time of vehicle arriving at the platform | Routing number | Number of passengers that have entered the restricted carriage for a routing number |
|---|---|---|---|---|
| C1 Vehicle No | . . . | . . . | . . . | . . . |

TABLE 8

Index of General Table of Passengers that Have Entered Restricted Carriage in the Riding Area:

| Directory name of riding area number, i.e. table index number | Location of general table of vehicle operation |
|---|---|
| DA riding area number | . . . |

The Table of Passengers that have Entered Restricted Carriage in a riding area and the index to the General Table of Passengers that Have Entered Restricted Carriage in the riding area constitute the General Table of Passengers that Have Entered Restricted Carriage in the riding area:

TABLE 9

Table of Number of Passengers that Have Entered Restricted Carriage in a Vehicle for ID vehicle, referred to as Table of Number of Passengers that Have Entered Restricted Carriage for a vehicle; table index number: ID vehicle; Routing number (log: week . . . , day, month, year)

| Riding area number | Vehicle arrival sequence | Time of vehicle arriving at the platform | Number of passengers that have entered the restricted carriage |
|---|---|---|---|
| C1 riding area number | . . . | . . . | . . . |

TABLE 10

Index of General Table of Passengers that Have Entered Restricted Carriage of the Vehicle:

| Directory name of riding area number, i.e. table index number | Location of general table of vehicle operation |
|---|---|
| DA riding area number | . . . |

The Table of Passengers that Have Entered Restricted Carriage of the vehicle and the index to the General Table of Passengers that Have Entered Restricted Carriage of the vehicle constitute the General Table of Passengers that Have Entered Restricted Carriage of the vehicle. Since the General Table of Passengers that Have Entered Restricted Carriage of a riding area is consistent with the General Table of Passengers that Have Entered Restricted Carriage of a vehicle, they are generally referred to as the General Table of Passengers that Have Entered Restricted Carriage:

TABLE 11

Registration Form of Riding Area:

| Registration No. of riding area | IP address of vehicle computer in riding area | Down time |
|---|---|---|
| . . . | . . . | . . . |

TABLE 12

Vehicle Registration Form: (including vehicle computer IP address)

| Vehicle registration number | Vehicle computer IP address | Parking duration |
|---|---|---|
| . . . | . . . | . . . |

The non-restricted carriage stops in the middle of the platform, and the restricted carriage stops at both ends or one end of the platform. The front of the train in the forward direction is restricted carriage A, and the rear of the train is restricted carriage B; correspondingly, the front of the train is riding area A and the rear of the train is riding area B. 67. According to claim 1, the said database system for controlling the gate of the subway riding area is characterized in that the relationship between the server and the operation center includes two modes:

(1) Connection mode: The main advantage is that the operation center will first transmit the determined large routing number of new vehicles to the server in real time, and the server computing unit can modify the Riding Area Operation Table or Vehicle Operation Table in real time.

That is, the server connects with the operation center, and the operation center transmits the train timetable to the server mode;

The operation center transmits the real-time train timetable to the server every day, and then, the server compares the real-time train timetable changes against the riding area operation table or the vehicle operation table. If there is any change, the server adjusts the riding area operation table or the vehicle operation table in real time; or the operation center sends out an instruction to change the train timetable, and the server will accordingly adjust the riding area operation table or the vehicle operation table in real time;

(2) Non-connection mode, in which the server is not connected to the operation center: the operation center does not transmit the real-time train timetable to the server. If there is any change, the server will adjust the riding area operation table or the vehicle operation table in real time; or the operation center sends out the instruction to change the train timetable, and the server will accordingly adjust the riding area operation table or the vehicle operation table in real time;

In the connection mode or the non-connection mode, the server calculates the average number of passengers that have entered restricted carriage on the basis of big data in the Table of Passengers that Have Entered the Restricted Carriage and uses it as the preset number to formulate the riding area operation table;

In the case of increasing the number of vehicles, the temporary preset number of an increased vehicle shall be determined by reference to the preset number of adjacent vehicles in the riding area operation table, and vice versa for a decreased vehicle in the case of decreasing the number of vehicles, For example, the production cycle of the Table of Passengers that Have Entered the Restricted Carriage is from Monday to Sunday, and the Table of Passengers that Have Entered the Restricted Carriage in each cycle is arranged by ID week sequence number from the beginning of operation to the end of operation. The average number of passengers (for weeks) that have entered the restricted carriage for each ID vehicle in ID riding area and ID week sequence number (parking sequence number, arrival time) is taken as the preset number of vehicle with this ID in the ID riding area and ID week sequence number (parking sequence number, arrival time).

That is, the server computing unit calculates the average number of passengers that have entered the restricted carriage of the ID vehicle on the basis of the big data from the Table of Passengers that Have Entered the Restricted Carriage and uses it as the preset number of ID vehicle with such ID. For the temporary preset number of temporarily increased vehicles, the temporary preset number of the temporarily increased vehicle shall be determined by reference to the preset number of adjacent ID vehicle with the same routing number (big and small routing numbers), and vice versa for a temporarily decreased vehicle; the preset number is relatively stable, and is generally revised once every 30 days. The temporary preset number of temporary vehicle number can be revised in real time;

That is, from Monday to Sunday is considered a unit. For each unit, from the beginning of the operation to the end of the operation every day, the number of passengers who get on the train during the parking time of each ID vehicle in the ID riding area is taken as the preset number of the ID vehicle in the ID riding area in the uniquely marked number of days.

For example, according to the big data at 8:00 on Monday in the Table of Passengers that Have Entered the Restricted Carriage, the average number of passengers that have entered the restricted carriages at the 6A vehicle number in the 12A riding area number is 20. The preset number of passengers for the 6A vehicle number in the 12A riding area number in the Riding Area Operation Table at this time is 20, that is, from Monday to Sunday is considered a unit, for uniquely marked number of days each week, from the beginning of operation to the end of operation. The number of passengers who get on the train during the parking time of each unique marked vehicle in the unique marked platform riding area is taken as the preset number of the unique marked vehicle in the unique marked platform riding area in the uniquely marked number of days (day of the week).

In the case of increasing the number of vehicles, the temporary preset number of an increased vehicle is determined by the reference to the preset number of adjacent vehicles in the Riding Area Operation Table, and vice versa for a decreased vehicle.

For example, according to the big data at 8:00 on Monday in the Table of Passengers that Have Entered the Restricted Carriage, the average of passengers that have entered the restricted carriage for 6A vehicle number with a large routing number in 12A riding area number is 20. In the Regular Riding Area Operation Table, the preset number of 6A vehicle number in 12A riding area at that time is 20.

At 8:01 on Monday, for the preset number of the increased vehicle, the preset number of the vehicle sequence number is determined to be 20 passengers by reference to the preset number of adjacent vehicles in the Riding Area Operation Table (20 passengers), and vice versa for a decreased vehicle.

If the increased vehicle has a large routing number, which is at 8:01, the temporary preset number of such increased vehicle is determined to be 20 passengers by reference to the preset number of 6A vehicle number of adjacent vehicle with the same routing number between 8:00 and 8:02. At the same time, the increased vehicle number is 7A vehicle, the vehicle number of the original vehicle (7A vehicle number) will be changed into 8A vehicle number, and other original vehicle numbers will be modified according to the natural sequence, and vice versa for a decreased vehicle, The main reason is that the operation center will first determine the large routing number of the increased vehicle and send it to the server. In the non-connection mode, the operation center does not timely send the determined large routing number of the increased vehicle to the server, which is likely to cause confusion for passengers.

The railway train includes the commercial train formation of the railway train, and carriages with non-restricted number of passengers includes the ordinary carriages, which are located in the middle of the platform or the carriages inside the platform; the carriages with restricted number of passenger include commercial carriages, which are located at one end or both ends of the platform.

It further includes the instruction system of the riding area computer which transmits the allowable number of passengers and the total number of existing passengers to the storage unit of the on-board computer through the wireless network. The on-board computer obtains the corrected allowable number of passengers according to such allowable number of passengers, the total number of existing passengers, the total number of passengers that have exited the outside carriages, the vehicle operation table and the instruction algorithm for correcting the number of passengers.

The server computing unit shall prepare the Riding Area Operation Table containing all operation riding areas and the Vehicle Operation Table containing all operation vehicles, and store the riding area operation table and vehicle operation table in the server database, the riding area computer or the storage unit of an on-board computer; both tables will be used or backed up by the instruction unit of the server, the riding area computer or the on-board computer.

The General Table of Riding Area Operation containing the riding area operation table of all operation riding areas can be broken down into the Riding Area Operation Table with special unique marks for each riding area number computer, for the storage and use by the computer in such riding area;

The storage unit of the said riding area computer stores the riding area operation table of the riding area; See Table 1;

The riding area operation table is a special table for each riding area computer, which is used to store the data provided for the instruction system of the riding area computer in the riding area to issue instruction to the riding area computer at the next station;

The storage unit of the said on-board computer stores the vehicle operation table of the vehicle; See Table 3;

The General Table of Vehicle Operation containing the vehicle operation table of all vehicles can be broken down into the Vehicle Operation Table with special unique mark of on-board computer of each vehicle number for the storage and use by such on-board computer;

Vehicle operation table is a special table for each on-board computer, which is used to store the data provided for the instruction system of the on-board computer of the vehicle to issue instruction to the riding area computer at the next station;

The computer in the said riding area includes a wireless communication unit, and the said wireless communication unit stores the IP address wireless communication table of the riding area computer or all vehicle computers. The wireless communication table of the said riding area or all vehicles includes the IP address wireless communication table of the riding area at the next station, all riding areas or all vehicles, which is used to transmit instruction information to the IP address of corresponding riding area, computer or server in the next station load zone.

Riding area IP address, riding area IP address of the next station, server IP address or train IP address, as shown in Table 8.

The server computing unit is designed to convert the train timetable of the operation center into this riding area operation table and the vehicle operation table, it is necessary for the server to change the riding area registration number and the vehicle registration number in the Riding Area Registration Table or the Vehicle Registration Table to the riding area number and the vehicle number in the Riding Area Operation Table or the Vehicle Operation Table; this process is called the mode of converting from the Riding Area Registration Table or Vehicle Registration Table of the train timetable to the Riding Area Operation Table or Vehicle Operation Table. And to store the modified riding area operation table and vehicle operation table in the database of the server, the storage unit of the riding area computer or the on-board computer for effective use on that day.

(1) The first step is to register the IP address of the ID riding area computer of all ID platforms, and to register the IP address and number of all ID vehicles in the Riding Area Registration Table and/or the Vehicle Registration Table.

(2) When the increase or decrease of platform or vehicle in the daily train timetable of the operation center is transmitted to the server, the server will add the corresponding number and IP of the increased platform or vehicle to the Riding Area Operation Table or the Vehicle Operation Table according to the train timetable, or delete the number or IP address of the decreased vehicle from the Riding Area Operation Table or the Vehicle Operation Table, and include it to the Riding Area Registration Table and/or the Vehicle Registration Table.

(3) Each train includes two restricted carriages A and B, as well as the on-board computer number of restricted carriages A and B and the IP address of on-board computers A and B.

Each platform includes two riding areas A and B, as well as the number of riding area computers in riding areas A and B and the IP address of the computers in riding areas A and.

(4) The operation center transmits the Train Timetable to the server in real time every day, and the server converts the Train Timetable into the Riding Area Operation Table or the Vehicle Operation Table in real time, such as increasing or decreasing riding areas and vehicles in real time.

(5) Each ID riding area has the Riding Area Operation Table of such ID riding area, including such ID vehicles, vehicle arrival sequence, time of vehicle arriving at the platform, original number of passengers, and preset numbers; all the Riding Area Operation Tables of the whole line are combined to form the General Table of Riding Area Operation of the whole line. The General Table of Riding Area Operation contains the index directory of the ID riding area operation table of the whole line;

Each ID riding area has the Table of Passengers that Have Entered the Restricted Carriage of such ID riding area (hereinafter referred to as Table of Passengers that Have Entered the Restricted Carriage), including such ID vehicle number, vehicle arrival sequence, time of vehicle arriving at the platform, and number of passengers that have entered the restricted carriages;

Each ID riding area has the Table of Allowable Number of Passengers of such ID load zone (hereinafter referred to as the Table of Allowable Number of Passengers for short, including such ID vehicle number, vehicle arrival sequence, time of vehicle arriving at the platform, and table of allowable number of passengers;

(6) Each ID vehicle has the Vehicle Operation Table of such ID vehicle, including such ID riding area, vehicle arrival sequence, time of vehicle arriving at the platform, original number of passengers, and preset number;

Each ID vehicle has the Table of Passengers that Have Entered the Restricted Carriage for such ID vehicle, which is referred to as the Table of Passengers that Have Entered the Restricted Carriage or Table of Passengers that Have Exited the Restricted Carriage, including such ID riding area, the vehicle arrival sequence, the time of vehicle arriving at the platform, and the number of passengers that have entered the restricted carriage; since the number of passengers that have entered the restricted carriage is equal to the number of passengers that have exited the restricted carriage in principle, the Table of Passengers that Have Entered the Restricted Carriage is equal to the Table of Passengers that Have Exited the Restricted Carriage in principle;

Each ID vehicle has the Table of Allowable Number of Passengers of the ID vehicle, referred to as the Table of Allowable Number of Passengers, which includes such ID riding area, vehicle arrival sequence, time of vehicle arriving at the platform, and allowable number of passengers;

(7) The vehicle arrival time in the riding area operation table and the vehicle operation table shall be kept in correspondence with the train timetable;

The riding area operation table and vehicle operation table fall into the category of logs. Each riding area has the riding area operation table of the day, and each vehicle has the vehicle operation table of the day. At the end of a day's operation, the riding area operation table of the day in each riding area and the vehicle operation table of the day for each vehicle will be stored in the database as redundancy and backup;

(8) The vehicle number in the Riding Area Operation Table or Vehicle Operation Table stored in the database indicates that the vehicle is in operation, and the riding area number indicates that the riding area is in operation; the vehicle registration number in the Vehicle Registration Table indicates that the vehicle is in a waiting status, and the riding area registration number in the Riding Area Registration Table indicates that the riding area is in a waiting status. They are mainly used for the server to convert the train timetable of the operation center into this riding area operation table and vehicle operation table;

(9) The IP address of on-board computer with vehicle number in the Vehicle Operation Table has been connected to the network and is running;

The IP address of the riding area computer with the riding area number in the Riding Area Operation Table has been connected to the network and is running;

(10) The IP address of the on-board computer with the vehicle registration number in the Vehicle Registration Table is not connected to the network and is not running;

The IP address of the riding area computer with the riding area registration number in the Riding Area Registration Table is not connected to the network and is not running;

(11) The original number of passengers in the train operation table refers to the total number of passengers in the restricted carriage before the door of train at the station opens, and the existing number of passengers refers to the total number of passengers in the restricted carriage at the time when the door of the train at the station closes.

(12) When each vehicle or riding area enters into operation, it must register in the table before entering into operation. If it does not enter into registration, it cannot enter into operation; when a vehicle or riding area changes from standby status to vehicle or riding area operation status, the vehicle registration number in the Vehicle Registration Table or the riding area registration number in the Riding Area Registration Table of the vehicle or riding area will be changed to the riding area number in the Riding Area Operation Table or the vehicle number in the Vehicle Operation Table; on the contrary, it is also true to switch from operating mode to standby mode.

(13) Each vehicle has a unique vehicle number, and vehicles with a unique vehicle number are represented as ID vehicles; each riding area has a unique riding area number, and the riding area with a unique riding area number is represented as an ID riding area;

(14) When there is an increased train, the server will determine the preset number of the vehicle at the next station by reference to the preset number of vehicles parked at the next station adjacent to the same platform at the same time.

Figure 1:
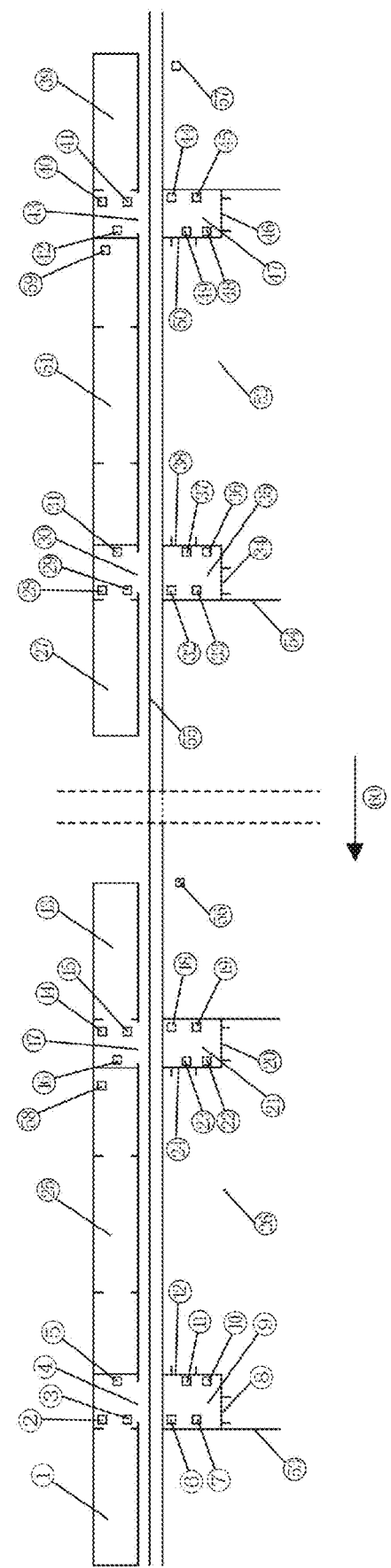
FIG. 1 shows the structure of the database system that controls the gate of the subway loading area, in which there are two consecutive arbitrary zn and zn+1 platforms and any cn vehicle on the platform, and in the vehicle there are two restricted carriages A and B; and in the platform there are two restricted carriage riding areas A and B.

1 is the restricted carriage A (carriages outside the station) of any cn vehicle parked at the zn+1 platform, 2 is the on-board computer of restricted carriage A (waiting carriage), 3 is the arrival and departure sensor b of train A on the restricted carriage (photoelectric switch at the corresponding position of the restricted carriage door); The following train arrival and departure sensors b include door sensor b, 4 is restricted carriage A door, 5 is restricted carriage A door which corresponds to at least one video passenger flow counter, and 6 is restricted carriage A door of riding area A which correspond to at least one video passenger flow counter; 7 is the train arrival and departure sensor b in a riding area f train A; 8 is the gate for exiting the riding area, 9 is the riding area of platform A, 10 is the riding area computer of platform A, and 11 is the entry gate control unit of riding area A. The entry gate control unit described in this document includes the industrial control unit of the riding area entry gate which is linked with the entry gate; 12 is the entry gate of riding area A; 13 is the restricted carriage (carriages outside the station) B, 14 is the on-board computer of restricted carriage B, 15 is the train arrival and departure sensors b of restricted carriage B, 16 is the video passenger flow counter corresponding to the door of restricted carriage B, 17 is the door of restricted carriage B, and 18 is the video passenger flow counter corresponding to the door of restricted carriage B in riding area B; 19 is the train arrival and departure sensor b in riding area B; 20 is the gate for exiting the riding area, 21 is riding area B, 22 is the computer for riding area B, 23 is the entry gate control unit for riding area B, and 24 is the gate for entering riding area B; 25 is an unrestricted (inside the station) carriage, 26 is a zn+1 platform; 27 is the restricted carriage (carriages outside the station) A of any vehicle cn parked at any zn platform, 28 is the on-board computer of restricted carriage (waiting carriage) A, 29 is the train arrival and departure sensor b of restricted carriage A, 30 is the door of restricted carriage A, 31 is the video passenger flow counter corresponding to the door of restricted carriage A, and 32 is the video passenger flow counter corresponding to the door of restricted carriage A in riding area A; 33 is the train arrival and departure sensor b in riding area A; 34 is the gate for exiting the riding area, 35 is the riding area A, 36 is the computer for riding area A, 37 is the entry gate control unit for riding area A, and 38 is the gate for entering riding area A; 39 is restricted carriage (carriage outside the station) B, 40 is the on-board computer of restricted carriage (waiting carriage) B, 41 is the train arrival and departure b of trains in restricted carriage B, 42 is the video passenger flow counter corresponding to the door of restricted carriage B, 43 is the door of restricted carriage B, 44 is the video passenger flow counter corresponding to the door of waiting carriage B in riding area B; 45 is the train arrival and departure sensor in riding area B; 46 is the gate for exiting the riding area, 47 is riding area B, 48 is the computer for riding area B, 49 is the entry gate control unit for riding area B, and 50 is the gate for entering riding area B; 51 is a non-restricted (inside the station) carriage, 52 is a zn platform, and 53 is the end wall of zn+1 platform; 54 is the end wall of zn platform; 55 is a wireless network. 56 is the train arrival and departure sensor a (photoelectric switch or infrared photoelectric switch at the corresponding position at the rear of the train) in riding area B of zn+1 platform; 57 is the train arrival and departure sensor a in riding area B of zn platform; 58 is the train arrival and departure movement sensor c of cn train in riding area B at zn+1 platform; 59 is the train arrival and departure movement sensor c of the cn vehicle in the riding area B of the zn platform; 60 is the forward direction of the vehicle.

The door sensor or door photoelectric switch is designed to link the corresponding equipment. When the door is opened, it will transmit the door opening signal to the passenger counter. The said passenger counter comprises the riding area gate entry and exit passenger counters, the restricted carriage entry and exit passenger counters, the outside station carriage entry and exit passenger counters, the static video passenger flow counter of the riding area, and the static video passenger flow counter of the waiting carriage riding area.

The said passenger counter is designed to start recording the number of passengers that have entered the restricted carriage or riding area when receiving the door opening signal from the door sensor, stop recording when receiving the door closing signal from the door sensor, and transmit the recorded number of passengers to the passenger counting subunit.

The said door sensor comprises a door photoelectric switch. The light of the said door photoelectric switch is aligned at the door or the middle seam of the door. Opening the carriage door means that the train enters the riding area, and closing the carriage door means that the train exits the riding area. When the door is opened, the door photoelectric switch transmits the door opening signal to the restricted carriage entry and exit passenger counters; when the door is closed, the door photoelectric switch transmits the door closing signal to the restricted carriage entry and exit passenger counters.

The said door sensor b comprises a door photoelectric switch. The door photoelectric switch uses the occlusion or reflection of the detected door on the light beam to complete the circuit by the synchronization loop, so as to detect the presence or absence of the door. The photoelectric switch converts the input current on the transmitter into an optical signal for emission, and the receiver detects the target door according to the intensity or presence of the received light. The said train body tail sensor a, comprises a train body tail photoelectric switch, which works in a similar way.

The door sensors also include the following categories: (1) On the platform, the door sensor can be connected to the safety door control switch corresponding to the restricted carriage in the riding area; when the safety door switch corresponding to the restricted carriage in the riding area is switched on, the door sensor sends an opening signal, and the counter starts to record the number of passengers; when the safety door switch corresponding to the restricted carriage in the riding area is switched off, the door sensor sends a closing signal, and the counter finishes recording the number of passengers. The door sensor on the carriage can be directly connected to the door control switch. When the door is opened, the door switch connects with the door sensor, and the door sensor obtains the signal of opening the door. When the door is closed, the door sensor obtains the signal of closing the door; (2) The door sensor comprises the door sensor connected with the PSD control switch of ATO or the restricted carriage door control switch; when the PSD control switch of ATO or the restricted carriage door control switch is switched on, the door sensor sends the door opening signal; When the PSD control switch of ATO or restricted carriage door control switch is switched off, the door sensor sends the door closing signal. (2) The door sensor includes the contact of the gate mechanical sensor aligned with the end of the door or safety door. When the door is opened, the contact is triggered by the end of the door or safety door, and the gate mechanical sensor obtains the signal that the door or safety door is opened. When the door is closed, the contact is not triggered by the end of the door, and the gate mechanical sensor obtains the signal that the door is opened;

(3) The door sensor contains a motor whose electromagnetic contact of the electromagnetic sensor is aligned with the door switch.

Figure 2:
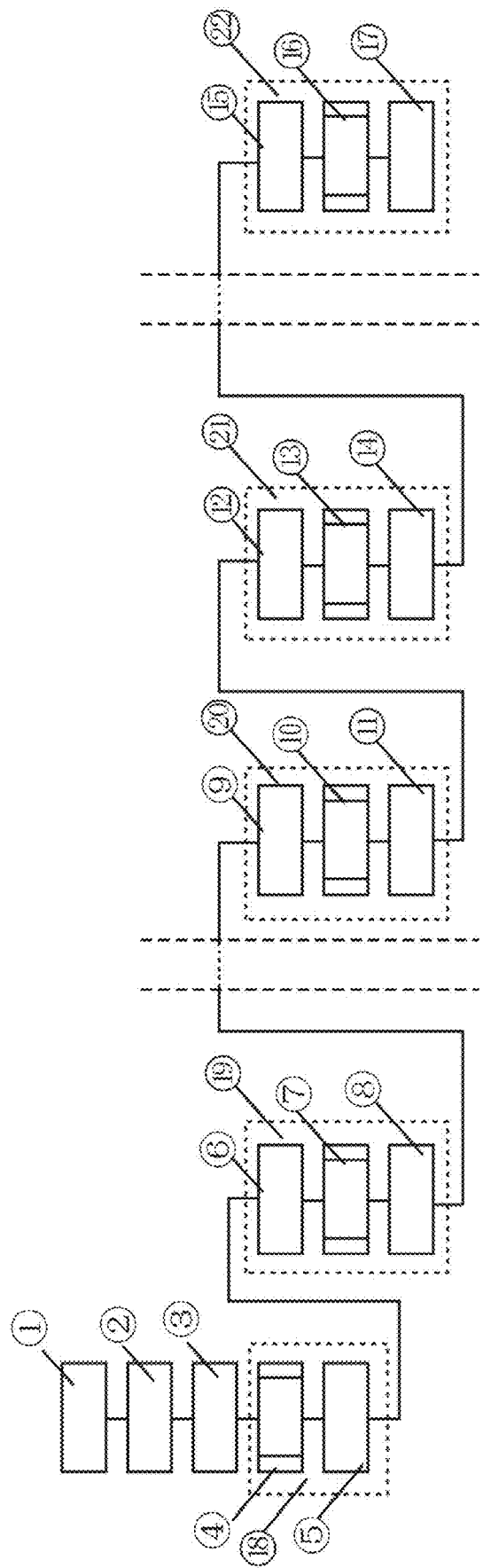

The said riding area computer comprises a wireless communication unit, the wireless communication unit further comprises a sending subunit and a receiving subunit. The sending subunit of the wireless communication unit of the riding area computer transmits information to the receiving subunit of the wireless communication unit of the on-board computer via the wireless network; the receiving subunit of the wireless communication unit of the riding area computer receives information from the sending subunit of the wireless communication unit of the on-board computer via the wireless network; the said on-board computer comprises a wireless communication unit, and the wireless communication unit further comprises a sending subunit and a receiving subunit, and the sending subunit of the wireless communication unit of the on-board computer transmits information to the receiving subunit of the wireless communication unit of the riding area computer via the wireless network; the receiving subunit of the wireless communication unit of the on-board computer receives information from the sending subunit of the wireless communication unit of the riding area computer via the wireless network;

Regarding the passenger counting unit (see FIG. 1.7.8): the passenger counting unit contains at least one; a door sensor whose function is to activate a passenger counting unit of the platform computer unit and/or the on-board computer unit when the door is opened, and the passenger counting unit obtains the total number of passengers; the door opening time is the agreed time which is any time from the start of the train at this station to the stop of the train at the next station, including the time of the train entering and leaving the station, the opening and closing time of the train door, etc.; the preferred time is the opening and closing time of train doors; the function of the door sensor is to sense the train entry signal, and when the train enters and exits the platform, it senses the train entry and exit signals, and transmits the obtained entry and exit signals to the passenger counting unit; the said sensor comprises a gate mechanical sensor, an electromagnetic sensor and an infrared sensor; the said passenger number counter comprises a (bidirectional) video passenger counter, which can be arranged at the carriage door and can calculate the number of passengers entering and leaving the carriage at an agreed time;

FIG. 2 is the main flow chart of the computer program of the gate instruction unit of the database system for controlling the gate of the subway riding area: 1 is start, 2 is the train timetable formulated by the operation center; 3 is that the operation center transmits the train timetable to the server calculation unit which formulates the preset number, the riding area operation table and the vehicle operation table, and transmits the riding area operation table to the corresponding riding area computer instruction unit; and transmits the vehicle operation table to the corresponding on-board computer instruction unit; 4 is the total number of passengers entering the restricted carriage obtained by the instruction unit of the first station at the door closing time and the video passenger flow counter; the passenger counting unit transmits the total number of passengers entering the restricted carriage to the instruction unit; the passenger counting unit transmits the number of passengers entering the restricted carriage to the Table of the Number of Passengers Entering the Restricted Carriage in the storage unit as a base for the server to calculate the preset number, with the same way for each station; the instruction unit obtains the existing number of passengers when the door is closed; sends out gate instruction and display screen instruction to the computer execution system of the A riding area of the next station (station 2); 5 is that at the starting station, the instruction unit stores the existing number of passengers into the original number of passengers of the next station (station 2) of the cn vehicle in the riding area operation table or the vehicle operation table. 6 is Station 2, the execution system of the computer in the riding area executes the said gate instruction and the display screen instruction; the gate control unit of the computer entering the riding area at station 2 is connected with the entrance gate and the passenger counter of the entrance gate, which records the number of passengers entering the riding area. When the number of passengers entering the riding area reaches the allowable number of passengers, the gate control unit closes the gate entering the riding area; 7 is the total number of passengers entering the restricted carriage obtained by the passenger counting unit at the door closing time of the instruction unit; the passenger counting unit transmits the total number of passengers entering the restricted carriage to the instruction unit; the instruction unit obtains the existing number of passengers when the train door is closed, and sends out the gate instruction and the display screen instruction to the computer execution system of A riding area at the next station (station 3); 8 is that at (station 2), the instruction unit stores the existing number of passengers of the cn vehicle at the closing time of the riding area of the station (station 2) into the original number of passengers of the next station (station 3) of the cn vehicle in the riding area operation table or the vehicle operation table. 9 is station 3, the execution system of the computer in the riding area executes the gate instruction and the display screen instruction; 10 is the total number of passengers entering the restricted carriage obtained by the passenger counting unit at the door closing time of the (station zn) instruction system; the passenger counting unit transmits the total number of passengers entering the restricted carriage to the instruction unit; the instruction unit obtains the existing number of passengers when the train door is closed, and sends out the gate instruction and the display screen instruction to the computer execution system of the riding area of the next station (station zn+1); 11 is that at (station zn), the computer instruction unit of riding area stores the existing number of passengers of the vehicle at the close time of the riding area of the station (station zn) into the original number of passengers of the riding area operation table or the next station (station zn+1) of the cn vehicle in the vehicle operation table. 12. Station zn+1, and the execution system of the computer in the riding area executes the said gate instruction and the display screen instruction; 13 is the total number of passengers entering the restricted carriage obtained by the passenger counting unit at the door closing time of the instruction unit (station zn+1); the passenger counting unit transmits the total number of passengers entering the restricted carriage to the instruction unit; the instruction unit obtains the existing number of passengers when the train door is closed, and sends out the gate instruction and the display screen instruction to the computer execution system of A riding area at the next station (station zn+2); 14 is that at (station zn+1), the instruction unit stores the existing number of passengers of the cn vehicle at the closing time of the riding area of the station (station zn+1) into the original number of passengers of the next station (station zn+2) of the cn vehicle in the riding area operation table or the vehicle operation table in the storage unit; 15 is the gate control unit of the computer in the turn-back (or terminal) A riding area, and the passenger counter resets the total number of passengers; 16 is that the turn-back (or terminal) conducts turn-back procedures; 17 is to enter the turn-back computer program or end the operation. After the end of the operation on the same day, all the computers in the riding area upload the Number of Passengers Entering the Restricted Carriage of the computer in the riding area on the same day and store it in the database Number of Passengers Entering the Restricted Carriage for the server computing unit to provide inquiry when formulate each preset number of vehicles in the next cycle (such as 3 weeks as a cycle in this paper), 18 is station 1's platform, 19 is station 2 platform, 20 is arbitrary station zn platform, 21 is station zn+1 platform, and 22 is turn-back (or terminal).

Figure 3:
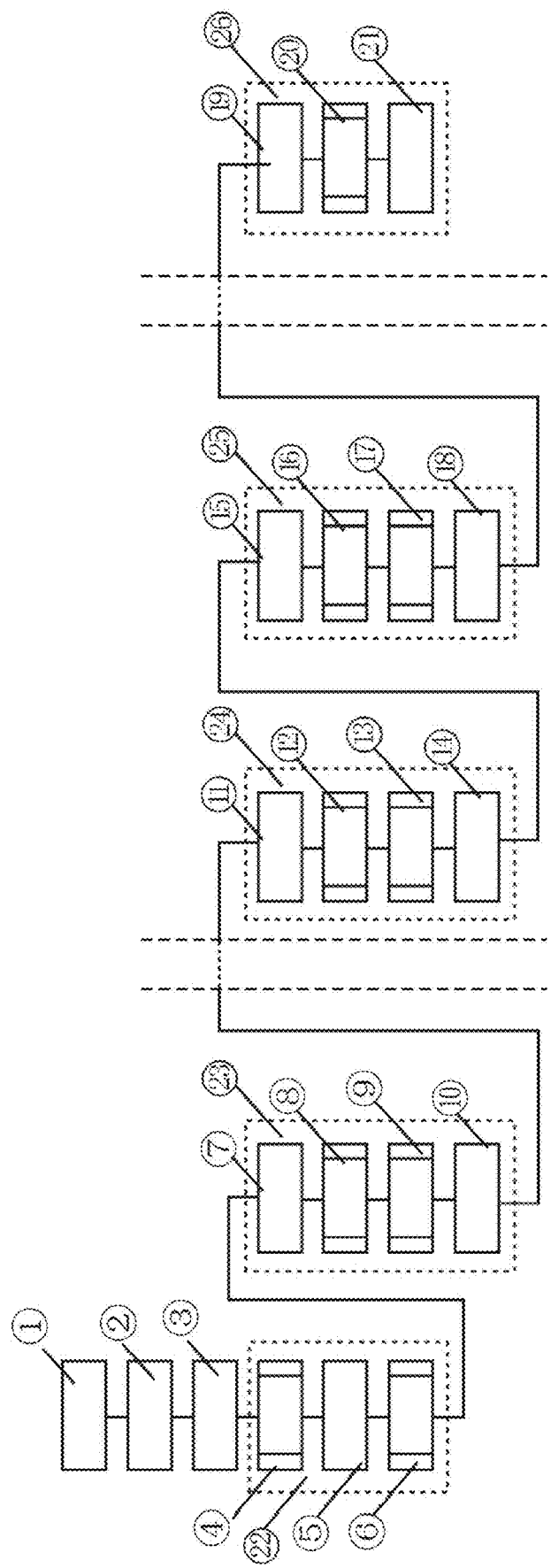

FIG. 3 is a flowchart of a computer program for correcting the number of passengers instruction of a database system for controlling the gate of the subway riding area:

That is, the static video passenger flow counter mode in the waiting carriage range corrects the number of passengers instruction unit:

The following is an example of any cn vehicle A waiting carriage running in A riding area according to the operation sequence on the line; that is, the database system that controls the gate in the riding area sends out the main flow chart of correcting the allowable number of passengers to the gate control unit of the computer in the riding area of the next station in the whole line: 1 is start; 2 is that the train schedule is worked out by the line operation center; 3 is that the line operation center transmits the train schedule to the server computing unit; 4 is that at the first station, it enters the gate instruction unit program at the close time of cn vehicle door: the said entrance gate instruction unit program: the passenger counting unit obtains the total number of passengers entering the restricted carriage from the train door opening to closing, the instruction unit obtains the existing number of passengers when the train door is closed, sends out the gate instruction and the display screen instruction to the computer execution system of A riding area in the next station (station 2), and displays the allowed number of passengers on the display screen; further comprises a display screen displaying the number of passengers allowed to enter the riding area in real time, the number of passengers allowed to enter the riding area in real time=the number of passengers allowed−the number of passengers who have entered the riding area in real time. The number of passengers entering the riding area in real time is the number of passengers entering the riding area at the real-time recording time after the closing time of the last train recorded by the riding area counter, and the gate entering the riding area will be closed when the number of passengers entering the riding area at the real-time recording time reaches the allowable number of passengers; 5 is that when the cn vehicle closes at the first station, the instruction unit stores the existing number of passengers of the cn vehicle at the closing time of the riding area of this station (the starting station) into the original number of passengers of the cn vehicle A in the next station (station 2) in the Vehicle Operation Table; stores the allowable number of passengers into the allowable number of passengers in the Table of Number of Allowed Passengers of cn vehicle in the next station (station 2); 6 is that when cn vehicle travels from station 1 to station 2 platform, it enters the program of correcting the allowable number of passengers instruction unit, and the said program of correcting the allowable number of passengers instruction unit: The static video passenger flow counter at the upper part of the waiting carriage range of the first agreed time (50 seconds after closing the door) obtains the number of passengers in the waiting carriage range, that is, the total number of passengers getting off at the next station, and the total number of passengers getting off at the next station is transmitted to the instruction unit of correcting the allowable number of passengers. The instruction unit of correcting the allowable number of passengers calls up the allowable number of passengers of the next station (the second station) from the allowable number of passengers in the next station (station 2) of cn vehicle A in the Table of Allowable Number of Passengers, and obtains the corrected allowable number of passengers, the corrected allowable number of passengers=the total number of passengers getting off at the next station−the allowable number of passengers at the next station (station 2); the corrected allowable number of passengers at the first agreed time=the total number of passengers getting off at the next station recorded at the first agreed time−the allowable number of passengers at the next station (station 2); sends an instruction to correct the allowable number of passengers to the computer in the next station (station 2) A, and an instruction to correct the allowable number of passengers to the computer in A riding area at the next station (station 2). Similarly, the corrected allowable number of passengers at the nth agreed time=the total number of passengers getting off at the next station recorded at the nth agreed time−the allowable number of passengers at the next station (station 2); sends the instruction of correcting the allowable number of passengers to the computer of A riding area at the next station 2), and the instruction of correcting the allowable number of passengers to the computer of A riding area at the next station (station 2), and repeat it until the door is opened, the same below (omitted); when the number of passengers entering the next riding area reaches the new allowable number of passengers, the entrance gate of the riding area will be closed; 7 is an instruction for executing the correction of the allowable number of passengers by the computer of A riding area at station 2; the display screen control unit displays a new allowable number of passengers on the display screen; 8 is entrance gate instruction unit program of cn vehicle at the closing time of the door at station 2: the passenger counting unit obtains the total number of passengers entering the restricted carriage from the opening to closing of the train door, and the instruction unit obtains the existing number of passengers when the train door is closed, and sends the gate instruction and display screen instruction to the computer execution system of A riding area at station 3; 9 is that at the closing time of the cn vehicle at station 2, the on-board computer of the waiting carriage A of the cn vehicle stores the existing number of passengers of the cn vehicle at the closing time in the board area of this station (station 2) into the original number of passengers of the cn vehicle A at the next station (station 3) in the Vehicle Operation Table; stores the allowable number of passengers into the allowable number of passengers in the Table of Allowable Number of Passengers of the cn vehicle at the next station (station 3);

10 is that when the cn vehicle travels from station 2 to station 3 platform, it enters the algorithm program of correcting the allowable number of passengers, as above; 11 is that the computer in A riding area of station 3 executes the instruction for correcting the allowable number of passengers issued by the on-board computer of cn vehicle A at station 2; the display screen control unit displays a new allowable number of passengers on the display screen; 12 is entrance gate instruction unit program of the cn vehicle at any station zn and at the door closing time: The total number of passengers entering the waiting carriage from the opening to closing of the train door obtained by the passenger counting unit, and the instruction unit obtains the existing number of passengers when the train door is closed, sends a gate instruction and a display screen instruction to the computer execution system in A riding area at the next station (station zn+1), 13 is that at the closing time of the cn vehicle at station zn, the on-board computer of the waiting carriage A of the cn vehicle stores the existing number of passengers of the cn vehicle at the agreed closing time in the riding area of the station (station zn) into the original number of passengers of the cn vehicle A at the next station (station zn+1) in the Vehicle Operation Table; stores the allowable number of passengers into the allowable number of passengers in the Table of Allowable Number of Passengers of the cn vehicle A at the next station (station zn+1); 14 is that when the cn vehicle travels from station zn to station zn+1, it enters the algorithm program of correcting the allowable number of passengers, as above; 15 is that the computer of A riding area at station zn+1 executes an instruction for correcting the allowable number of passengers issued by the on-board computer of the cn vehicle at station zn; the display screen control unit displays the new allowable number of passengers on the display screen; 16 is entrance gate instruction unit program of the cn vehicle at station zn+1 and at the door closing time: The total number of passengers entering the waiting carriage from the opening to closing of the train door obtained by the passenger counting unit, and the instruction unit of the computer or server in the A riding area obtains the existing number of passengers when the train door is closed, and sends out gate instruction and display screen instruction to the computer execution system of A riding area at the next station (station zn+2). At the door closing of the cn vehicle at station zn+1, the on-board computer of the waiting carriage A of the cn vehicle stores the existing number of passengers of the cn vehicle at the agreed closing time in the riding area at the station (station zn+1) into the original number of passengers of the Vehicle Operation Table of the cn vehicle A at the next station (station zn+2); stores the allowable number of passengers into the allowable number of passengers in the Table of Allowable Number of Passengers of the cn vehicle A at the next station (station zn+2); 17 is that when the cn vehicle travels from station zn+1 to station zn+2, it enters the algorithm program of correcting the allowable number of passengers, as above;

18 is the computer in the riding area at station zn+2 executes the correcting allowable number of passengers instruction issued by the on-board computer of the cn vehicle at station zn+1; the display screen control unit displays a new allowable number of passengers on the display screen; 19 is that the on-board computer of turn-back (or terminal) cn vehicle A resets the total number of passengers; 20 is that turn-back (or the terminal) conducts turn-back procedures, or ends the operation; 21 is to enter the turn-back computer program or end the operation. After the end of the operation on the same day, all the computers in the riding area upload the Table of Passengers Entering Restricted Carriage and Riding Area Operation Table of the computers in the riding area to the server for the server computing unit to use when formulating the preset number used in the next cycle (for example, 3 weeks are a cycle in this paper); 22 is station 1 platform, 23 is station 2 platform, 24 is any station zn platform, 25 is station zn+1 platform, and 26 is turn-back (or terminal).

Figure 4:
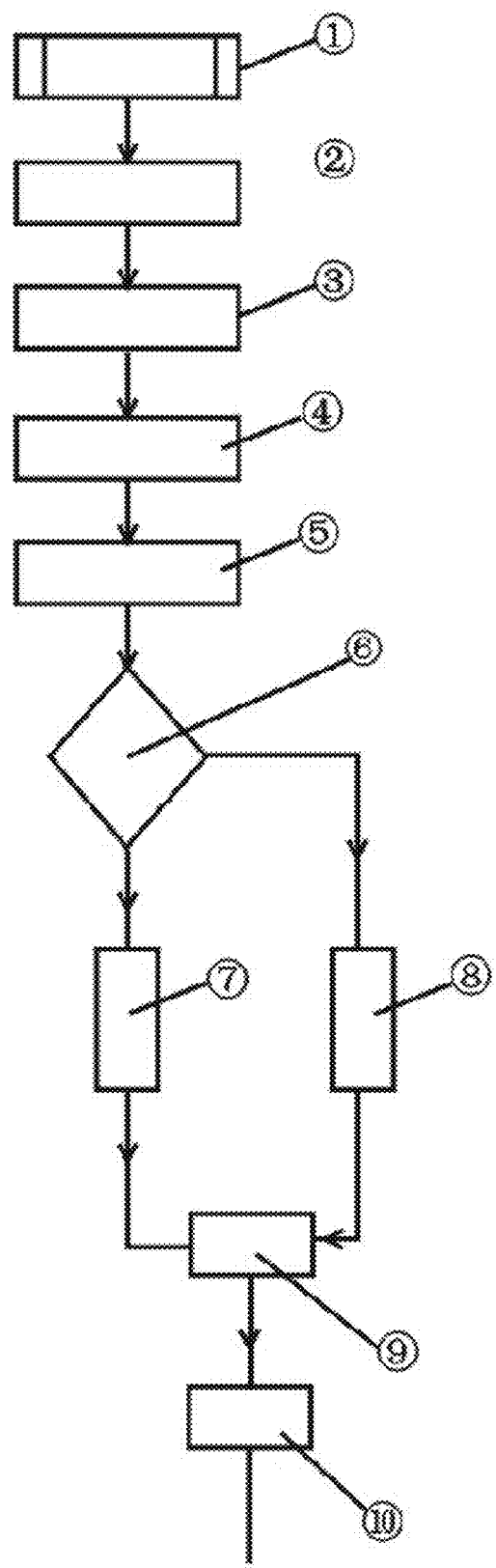

FIG. 4 is a main flow chart of the computer program of the gate instruction algorithm:

zn platform represents any platform, and zn+1 platform represents the next continuous platform in the forward direction of any platform; cn restricted carriage represents an arbitrary restricted carriage, and cn+1 restricted carriage represents a continuous upper restricted carriage in the forward direction of the arbitrary restricted carriage.

For example, the instruction unit of the riding area computer at any zn platform sends the gate instruction and the display screen instruction to the gate control unit and the display screen control unit of the next platform zn+1 riding area computer: The train entrance and exit platform sensors take the door sensor as an example, and the function of connecting the restricted carriage entry and exit passenger counter with the passenger counting subunit is equivalent to the function of the video passenger flow counter. The following video passenger flow counter is taken as an example; the said video passenger flow counter is arranged on the platform position corresponding to the door of the restricted carriage in the riding area as an example;

1 is that when the train cn restricts the carriage from entering the zn platform, the door sensor of the zn platform transmits the door opening signal to the video passenger flow counter of the zn platform at the door opening time; 2 is that the video passenger flow counter of zn platform starts to count the number of people; 3 is that when the train leaves the zn platform, the door sensor transmits the door closing signal to the video passenger flow counter at the door closing time, and the video passenger flow counter ends counting the number of people, and transmits the number of passengers entering the restricted carriage to the Table of the Number of Passengers Entering the Restricted Carriage of the storage unit when the door is opened until the closing time; 4 is that the video passenger flow counter transmits the total number of passengers entering the restricted carriage from door opening to closing to the gate instruction unit, and the gate instruction unit calls up the original number of passengers in the cn restricted carriage in the zn passenger area from the Riding Area Operation Table of the storage unit; the gate instruction unit obtains the existing number of passengers, the existing number of passengers=the total number of passengers entering the restricted carriage from door opening to closing+the original number of passengers, and the gate instruction unit transmits the existing number of passengers to the original number of passengers of the cn restricted carriage in the next station zn+1 riding area in the Riding Area Operation Table of the storage unit; as the next station zn+1 riding area instruction unit, it calculates the base existing number of passengers in the cn restricted carriage, 5 is that the gate instruction unit in any zn riding area obtains the gate instruction according to the existing number of passengers;

The gate instruction obtains the number of passengers allowed to enter the zn+1 riding area at the next station, referred to as the allowable number of passengers, and the allowable number of passengers=the existing number of passengers–the maximum number of passengers–the preset number; the gate instruction unit transmits the gate instruction to the gate execution unit of computer in the riding area at the next station; 6 is that the function of the gate control unit of computer in the riding area at the next station $z_{n+1}$ is to execute the said gate instruction, and the display screen execution unit of computer in the riding area at the next station $z_{n+1}$ controls the display screen and displays the allowable number of passengers on the display screen; including displaying the number of passengers allowed to enter the riding area in real time, referred to as the number of real-time allowed passengers; the number of real-time allowed passengers=the allowable number of passengers–the number of passengers who have entered the riding area in real time. The number of passengers who have entered the riding area in real time is the recorded number of real-time passengers who entered the gate in the $z_{n+1}$ riding area after the $c_{n+1}$ restricted carriage of the previous train left $z_{n+1}$; selection is available, 7 is that the gate of entering the riding area is opened when the number of passengers entering the riding area does not reach the allowable number of passengers; 8 is that when the number of passengers entering the riding area reaches the allowable number of passengers, the gate control unit closes the riding area gate; the purpose of controlling the number of passengers entering the restricted carriage to the maximum number of passengers is achieved. 9 is that $c_n$ restricted carriage circulates continuously in all riding areas of the whole line as above, so as to control the number of passengers entering restricted carriage on all platforms of the whole road network to the maximum number of passengers, and 10 is the Table of the Number of Passengers Entering Restricted Carriages stored in the Summary Table of the Number of Passengers Entering Restricted Carriages of the database at the end of all-day operation.

Figure 5:
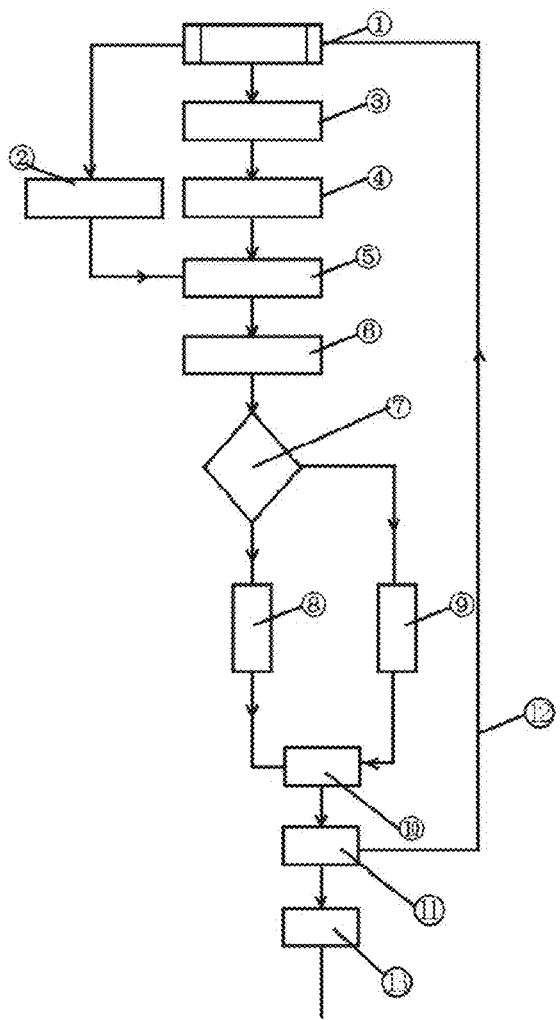

FIG. 5 is a main flow chart of a computer program for correcting the allowable number of passengers instruction unit of the database system controlling the gate of the riding area:

That is, the static video passenger flow counter in the waiting carriage range and correcting passenger number instruction unit in the video passenger flow counter mode at the entrance and exit doors of the carriage outside the station:

Correcting the allowable number of passengers gate instruction and display screen instruction for the on-board computer of the $c_n$ carriage to travel to the next station $z_{n+1}$ platform at any $z_n$ platform; correcting the allowable number of passengers gate instruction system comprises an outbound carriage passenger counting unit, correcting the allowable number of passengers gate instruction unit and a storage unit;

The outbound carriage passenger counting unit comprises a door sensor, a static video passenger flow counter of the waiting carriage at the closing time, the $1^{st}$ agreed time and the $n^{th}$ agreed time, and at least one video passenger flow counter arranged at the upper part of the door of the inbound and outbound carriages, referred to as the outer carriage door video passenger flow counter; the static video passenger flow counter of the waiting carriage records the number of passengers in the range of the waiting carriage; the video passenger flow counter of the outer carriage door starts to record the total number of passengers of the outbound carriage door, and the $1^{st}$ agreed time is set as the time 50 seconds after the closing time of the waiting carriage;

The $2^{nd}$ agreed time is set to count the total number of passengers going out of the carriage door every other time (10 seconds) after the $1^{st}$ agreed time;

The $n^{th}$ agreed time is set to count the total number of passengers going out of the carriage door every other time ($n \times 10$ seconds) after the $1^{st}$ agreed time;

It stops recording the total number of outbound carriage door passengers at the $1^{st}$ agreed time, and transmits the total number of outbound carriage door passengers from the closing time to the $1^{st}$ agreed time to the outbound carriage passenger counting unit. The outbound carriage passenger counting unit obtains the total number of passengers getting off at the next station, which=the total number of outbound carriage door passengers from the closing time to the $1^{st}$ agreed time+the number of passengers in the range of the waiting carriage;

It stops recording the total number of outbound carriage door passengers at the $n^{th}$ agreed time, and transmits the total number of outbound carriage door passengers from the closing time to the $1^{st}$ agreed time to the outbound carriage passenger counting unit. The outbound carriage passenger counting unit obtains the total number of passengers getting off at the next station, which=the total number of outbound carriage door passengers from the closing time to the $n^{th}$ agreed time+the number of passengers in the range of the waiting carriage;

1 is that when the train $c_n$ restricted carriage leaves the $z_n$ platform, the door sensor transmits the door closing signal to the static video passenger flow counter in the waiting carriage range and the out-of-station carriage video passenger flow counter at the door closing time;

2 is the number of passengers in the waiting carriage range is counted in the static passenger flow counter; at the $1^{st}$ agreed time, the instantaneous number of passengers in the waiting carriage is transmitted to the total number of passengers counting unit of the outbound carriage; 3 is that at the door closing time, the video passenger flow counter of the outbound carriage door starts to record the number of passengers at the outbound carriage door; 4 is that the video passenger flow counter of the outer carriage door stops to record the number of outbound carriage door passengers at the first agreed time, and transmits the total number of outbound carriage door passengers from the closing time to the $1^{st}$ agreed time to the outbound carriage passenger counting unit. The outbound carriage passenger counting unit obtains the total number of passengers getting off at the $1^{st}$ agreed time, and the total number of passengers getting off at the $1^{st}$ agreed time=the number of passengers in the waiting carriage range+the total number of passengers leaving the carriage door from the closing time to the $1^{st}$ agreed time; and transmits the total number of passengers getting off at the $1^{st}$ agreed time to the instruction unit which queries out the allowable number of passengers at the next station from the Table of Allowable Number of Passengers, and obtains the correcting allowable number of passengers at the $1^{st}$ agreed time=the total number of passengers getting off at the $1^{st}$ agreed time–the allowable number of passengers; similarly, the correcting allowable number of passengers in the $n^{th}$ agreed time=the total number of passengers getting off at the $n^{th}$ agreed time–the allowable number of passengers;

6 is that the instruction unit transmits the correcting allowable number of passengers at the $1^{st}$ agreed time to the gate control unit of the next station $z_{n+1}$ riding area computer;

7 is that the function of the gate control unit of the next station $z_{n+1}$ riding area computer is to execute the instruction issued by the said correcting allowable number of passengers instruction. The display screen execution unit of the computer in the next station $z_{n+1}$ riding area displays the number of passengers allowed by the new $1^{st}$ agreed time on the display screen for selection; 8 is that when the number of passengers entering the riding area does not reach the allowable number of passengers at the new first agreed time, the gate control unit opens the gate entering the riding area; 9 is that when the number of passengers entering the riding area reaches the allowable number of passengers at the new Pt agreed time, the gate of the riding area is closed; the purpose of controlling the number of passengers entering the restricted carriage to the maximum number of passengers is achieved; 10 is that after the first agreed time, the vehicle continues to move forward; 11 is that the correcting allowable number of passengers instruction at the $n^{th}$ agreed time is calculated at the $n^{th}$ agreed time, and the number of passengers allowed to enter the $n^{th}$ agreed time=the number of passengers of the inbound carriage of the cn carriage from the beginning to the end of the $n^{th}$ agreed time−the number of passengers allowed to enter; the correcting number of passengers allowed to enter at the $n^{th}$ agreed time is an $n^{th}$ duplication of the correcting number of passengers allowed to enter pattern at the $1^{st}$ agreed time; 12 is that calculating and repeating steps 1-10 starts at the $n^{th}$ agreed time; 13 is that it is until the train arrives at zn+1 platform.

Figure 6:
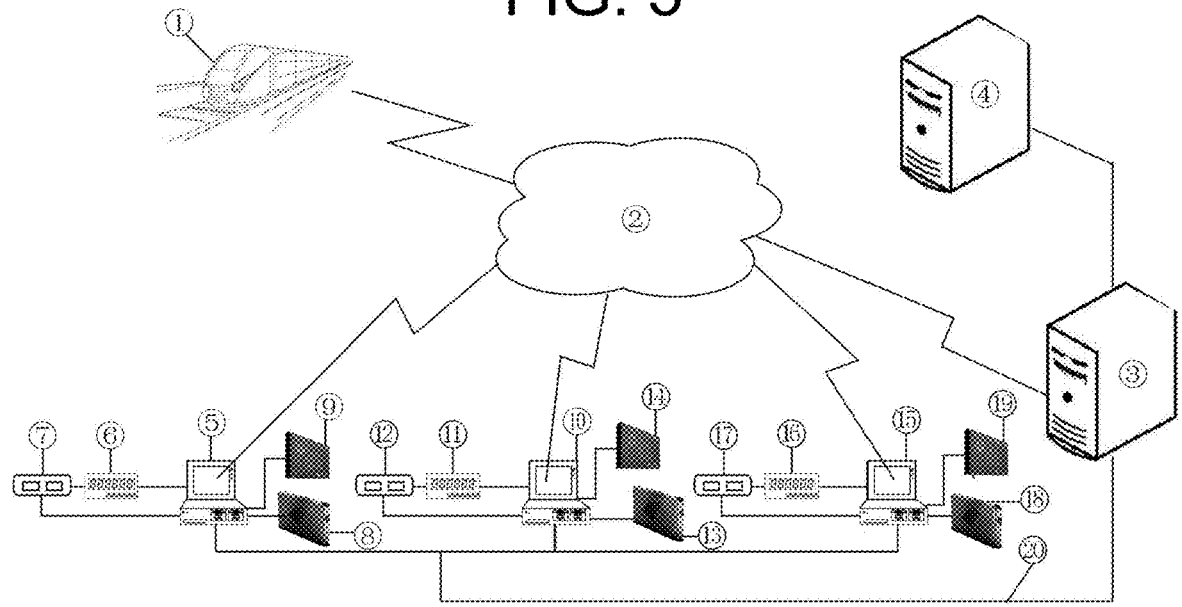

FIG. 6 is a physical diagram of the database system for controlling the gate of the subway riding area:

1 is a railway train and an on-board computer, 2 is a wireless network. The on-board computer communicates with a server or a platform computer at the next station through the wireless network. The said wireless communication in this paper includes mobile communication modes such as dedicated wireless communication, Passenger Information Service System (PIS), Internet, WiFi, 3G, 4G and 5G; whole range mobile wireless communication (RF CBTC); track crossover cable mode (IL CBTC); leaky cable or leaky waveguide mode; query responder; satellite communication system; including transmitting data or images of passengers entering the out-of-station carriage to the platform computer or server through the passenger information system.

3 is a line server, referred to as a server for short, 4 is a control center, 5 is the next continuous zn+1 riding area computer in the forward direction of the riding area computer of any zn platform, 6 is the door sensor of the zn+1 riding area computer, 7 is the passenger counter of the zn+1 riding area, including a video passenger flow counter; 8 is the gate control unit for entering the boarding area of zn+1; 9 is the riding area display screen control unit of zn+1; 10 is the riding area computer in any zn riding area, 11 is a door sensor in the zn riding area, 12 is a passenger counter in the zn riding area, 13 is a gate control unit for entering the riding area of the zn, 14 is a riding area display control unit of the zn; 15 is a continuous zn−1 riding area computer in the backward direction of the riding area computer in the zn riding area, 16 is a door sensor in the zn−1 riding area, 17 is a passenger counter in the zn−1 riding area, 18 is a gate control unit for entering the riding area of the zn−1, 19 is a display screen control unit of the zn−1 riding area; 20 is a wired network system.

The database system for controlling the gate of the riding area includes the bus topology structure of the instruction system, the execution system and the server and the mixed mode structure diagram of the wireless network (the bus topology structure of the server and the mixed mode physical diagram of the wireless network), or the client\server database system (C\S): the browser/server B\S mode; with regard to the wireless network, the transmitting unit of the on-board computer of the wireless network of the present technology can also be connected with the server by using SIM card through wireless network connections such as 3G, 4G, 5G, etc. The on-board computer can be connected with the computer in the riding area through the Internet, and can be connected with the computer in the riding area through leaky coaxial cable or WIFI.

Figure 7:
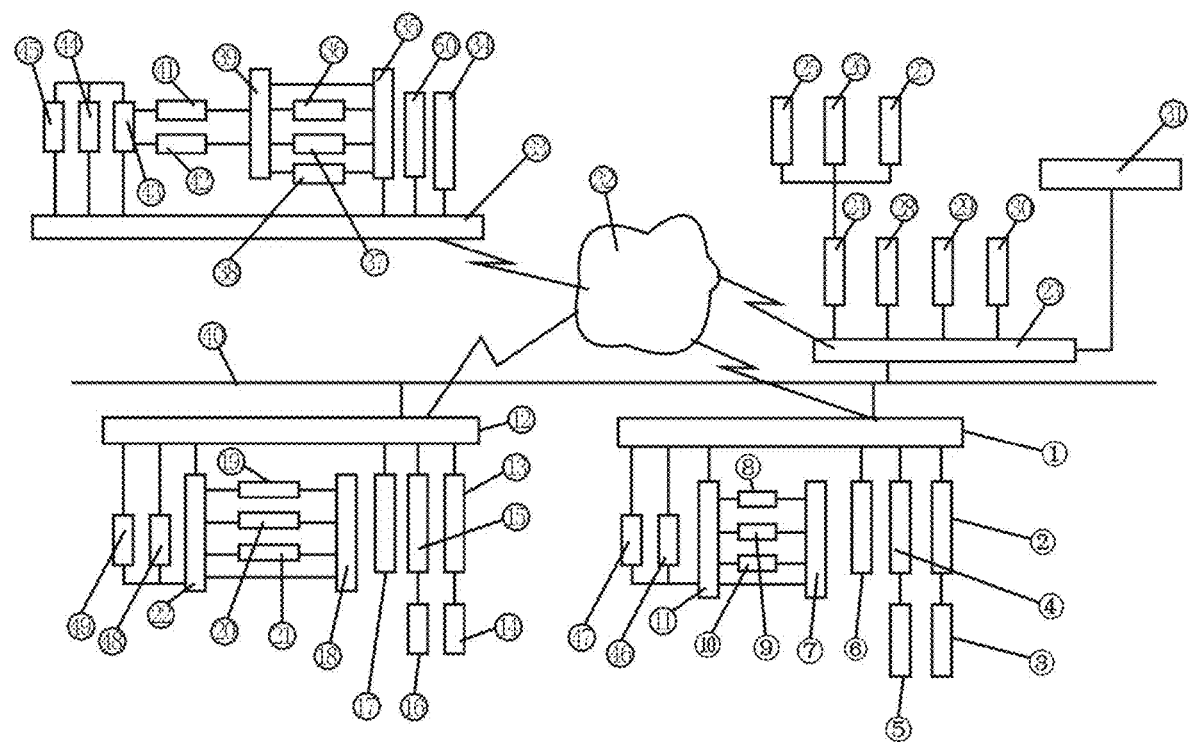

FIG. 7 is the overall structure diagram of the database system controlling the gate of the platform riding area.

1 is the riding area computer of any zn riding area; 2-5 are the zn riding area execution system; 2 and 3 are the display screen sub-control units of zn riding area; 2 is the display screen control unit of zn riding area, including the display screen industrial control module; 3 is the display screen of zn riding area; 4 and 5 are the gate control unit entering the riding area of zn riding area; 4 is the gate control unit entering the riding area of zn riding area; 5 is the gate entering the riding area of zn riding area; 6-11 are the zn riding area instruction system; 6 is the storage unit of the riding area computer unit of the zn riding area; 7-11 are the passenger counting unit entering the restricted carriage of the instruction system of zn riding area; 7 is the train inbound and outbound sensor in zn riding area; 8 is the passenger flow counter of entering restricted carriage in zn riding area or the passenger flow counter in riding area; 9 is the out-of-limit passenger flow counter in zn riding area or the passenger flow counter in riding area; 10 is the regional passenger flow counter of the riding area of the zn riding area; the said regional passenger flow counter comprises a static video passenger flow counter; 11 is the passenger counting subunit of entering restricted carriage of the zn riding area computer; Among them, 8, 9 and 11 are video passenger flow counters at the corresponding positions of the restricted carriage doors are often used; 12 is the riding area computer of zn+1 riding area; 13-16 are the zn+1 riding area execution system; 13 and 14 are the display screen control unit of zn+1 riding area; 13-16 are the zn+1 riding area execution system; 13 is the display screen control unit of zn+1 riding area; 14 is the display screen of zn+1 riding area; 15 and 16 are the gate control unit of the zn+1 riding area; 15 is the gate control unit of zn+1 riding area; 16 is the gate of entering the riding area of zn+1 riding area; 17-22 are the zn+1 riding area instruction system; 17 is a storage unit of the riding area computer unit of the zn+1 riding area; 18-22 are the passenger counting unit of the instruction system entering the restricted carriage of zn+1 riding area; 18 is the sensor of train entering and leaving the riding area in zn+1 riding area; 19 is the passenger flow counter of entering restricted carriage in the zn+1 riding area or the passenger flow counter of the riding area; 20 is the passenger flow counter of going out of the restricted carriage or the passenger flow counter of the riding area in the zn+1 riding area; 21 is the regional passenger flow counter of the riding area of the zn+1 riding area; including static video passenger flow counter; 22 is the passenger counting subunit of the entering restricted carriage of the riding area computer of the zn+1 riding area; Among them, 19, 20 and 22 are video passenger flow counters at the corresponding positions of restricted carriage doors are often used; 23-29 are the instruction system of the server; 23 is the server; 24 is the server instruction system; 25 is the gate instruction unit of the server, 26 is the display screen instruction unit of the server, 27 is the correcting allowable number of passengers instruction unit of the server, 28 is the server calculation unit; 29 is the server database; 30 is the server (wireless) communication unit; 31 is the operation dispatching control center, referred to as the control center; 32 is the wireless communication network; 33 is an on-board computer unit, 34 is the storage unit of the on-board computer; 35-39 are the correcting allowable number of passengers instruction unit of the on-board computer instruction system; 35 is the passenger counting subunit of the outbound carriage of the cn on-board computer correcting allowable number of passengers instruction unit; 36 is the passenger flow counter of any cn on-board entering outbound carriage; 37 is the cn on-board passenger outbound carriage flow counter; Among them, 35, 36 and 37 are video passenger flow counters at the corresponding positions of entering and leaving outbound carriage are often used; 38 is the regional static video passenger flow counter in the riding area of the cn on-board waiting carriage; 39 is the train inbound and outbound sensor; 40 is the wired communication unit. 39-45 are the gate instruction unit and display screen instruction unit of the on-board computer instruction system; 39-43 are the passenger counting unit of the on-board computer instruction system; 41 is the passenger flow counter of entering restricted carriage; 42 is the passenger flow counter of going out of restricted carriage; 43 is the passenger counting subunit of the on-board computer entering the restricted carriage; among them, 41, 42 and 43 are video passenger flow counters of restricted corresponding positions of carriage doors on the waiting carriage; 44 is the gate instruction unit of the on-board computer; 45 is the display screen instruction unit of the on-board computer; 46 is the gate instruction unit of zn riding area; 47 is the display screen instruction unit of zn riding area; 48 is the gate instruction unit of zn+1 riding area; 49 is the display screen instruction unit of zn+1 riding area; 50 is the correcting allowable number of passengers instruction unit of the on-board computer. Among them, the instruction system function of 39-43 server can be completed by the instruction system function of 43-45 on-board computer as redundant function; the function of the instruction system for correcting the allowable number of passengers in 35-39 server can be completed as a redundant function by the function of the instruction system for correcting the allowable number of passengers in 50 on-board computer; the instruction system function of 7-11 server can be completed by the instruction system function of the riding area computer of 46-47 as redundant function; the instruction system function of 18-22 server can be completed as redundant function by the instruction system function of 48-49 riding area computer. In a word, the function of the instruction system of the riding area computer, the instruction system of the on-board computer and the instruction system of the server can be used as mutual redundancy functions.

Figure 8:
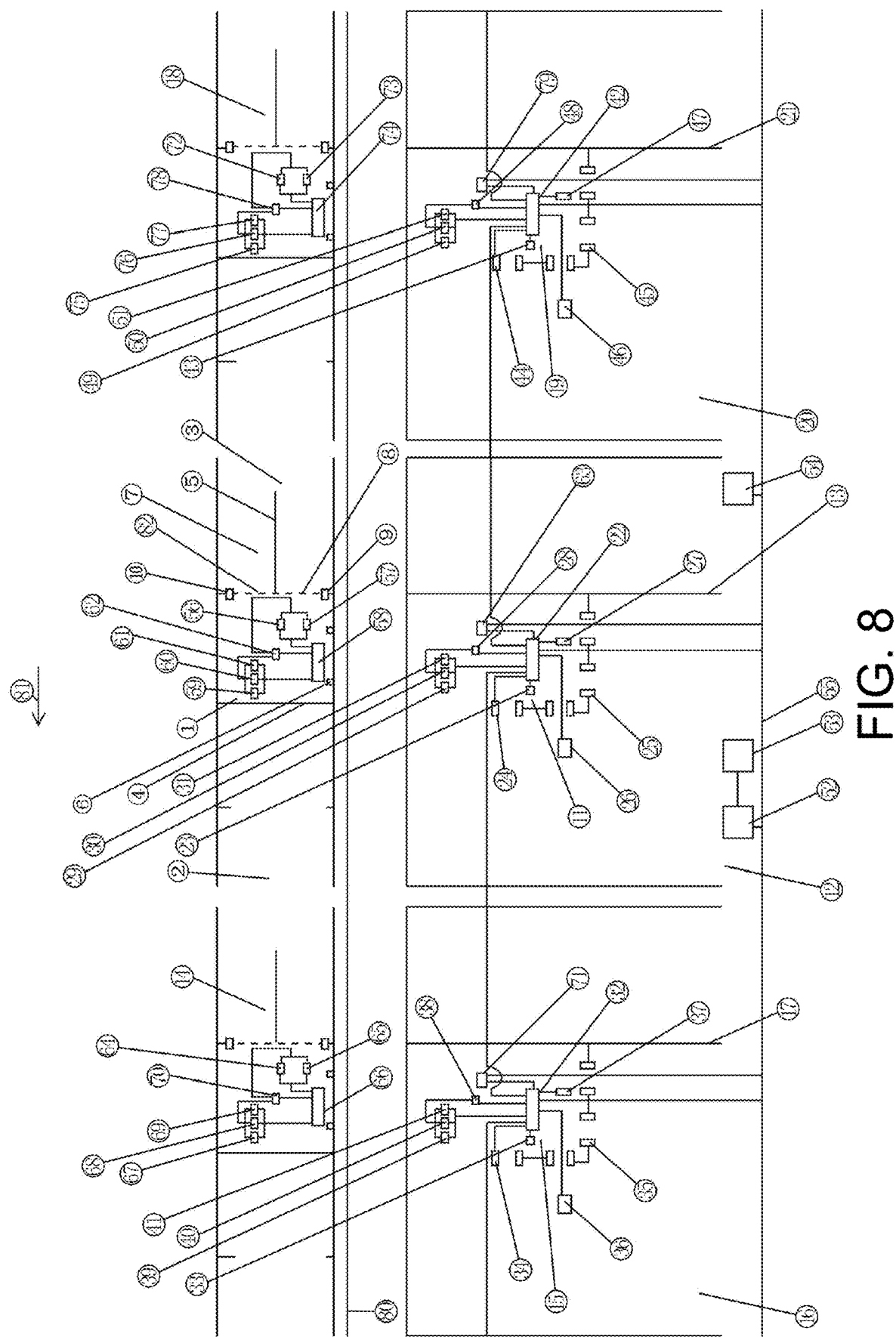

FIG. 8 is a structural diagram of an instruction system and an execution system of a database system for controlling a gate of a subway riding area:

That is, the location map of the total equipment parked on any three consecutive platforms: take the B riding area as an example, and the following B riding area is referred to as the platform.

The instruction unit of the database system for controlling the gate of the platform riding area is divided into 4 mode structure diagrams, (1) the mode structure diagram of the passenger number counting unit connected with the server instruction unit, (2) the mode structure diagram of the video passenger flow counter on the waiting carriage connected with the on-board computer instruction unit, (3) the mode structure diagram of the video passenger flow counter connected with the computer instruction unit in the riding area, (4) the mode structure diagram of the static video passenger flow counter in the riding area and the entrance and exit gate passenger flow counter in the riding area connected with the computer instruction unit in the riding area, and the 4 mode structure diagrams are mutually redundant; the platform riding area computer includes an instruction system and an execution system, in which the execution system mainly means that the instruction system of the previous station sends out the gate instruction, the display screen instruction and the correcting allowable number of passengers to the execution system of the riding area computer of this station.

The instruction system comprises a gate instruction unit, a display screen instruction unit and a revised allowable number of passengers instruction unit, wherein the number of passengers counting unit entering the restricted carriage comprises three modes. 1 is composed of a door sensor and a video passenger flow counter corresponding to restricted carriage door in the riding area on the platform; referred to as riding area counter mode. 2 is composed of a car door sensor and a video passenger flow counter corresponding to a restricted carriage door on the carriage; referred to as on-board counter mode; 3 is composed of a door sensor, passenger counters for entering and leaving the gate in the riding area on the platform, and a static video passenger flow counter in the riding area. Referred to as counter mode of gate in the riding area Any platform located in the line is denoted by zn platform, the platform continuous with zn platform vehicles in the vehicle advancing direction is denoted by zn+1 platform, and the platform in the vehicle retreating direction of zn platform is denoted by zn−1 platform; zn−1 platform, zn platform and zn+1 platform are 3 consecutive platforms, corresponding to cn−1 vehicle, cn vehicle and cn+1 vehicle parked respectively.

1 is the waiting carriage, 2 is the in-station carriage, 3 is the out-station carriage, 4 is the partition wall or door between the in-station carriage and the waiting carriage, and 5 is the partition in the out-station carriage, which divides the carriage into an entering carriage passage and leaving carriage passage; 6 is the door of the waiting carriage, 7 is the train (cn vehicle) located at any station (zn platform), 8 is the boundary between the waiting carriage and the out-station carriage, 9 is the inbound carriage door, 10 is the outbound carriage door, 11 is the totally enclosed outbound carriage riding area connected by gate and partition on zn platform, referred to as the riding area; the gate of the following riding area contains the inbound counter of the riding area, and the counter in this paper includes the gate type, infrared induction counter or video passenger flow counter; the gate of the leaving riding area comprises outbound counter of the riding area; 12 is the zn platform, 13 is the end wall of the zn platform, 14 is the cn+1 train at the zn+1 platform, 15 is the riding area of zn+1 platform, 16 is the zn+1 platform, 17 is the end wall of zn+1 platform, 18 is the cn−1 train at zn−1 platform, 19 is the riding area of zn−1 platform, 20 is the zn−1 platform, 21 is the end wall of zn−1 platform, 22 is the riding area computer located on the zn platform, 23 is the passenger counter in the entering riding area located on the zn platform, 24 is the entrance gate and gate industrial control switch located in the riding area of the zn platform; 25 is the leaving riding area gate located at the zn platform, 26 is the display screen located at the zn platform, 27 is the leaving riding area passenger counter at the zn platform, 28 is the train inbound and outbound sensor of zn platform, and the said train inbound and outbound sensors are referred to as door sensors; the door sensor is arranged on the platform corresponding to the waiting carriage door or screen door, 29, 30 and 31 are the video passenger flow counters of zn platform, and the video passenger flow counters of the platform include three types:

29 (1) is the video passenger flow counter of the entering waiting carriage door; it is arranged on one side of the platform of the screen door for recording the number of passengers entering the waiting carriage door within a certain period of time; 30 (2) is the video passenger flow counter of leaving waiting carriage door; It is arranged on one side of the platform of the screen door for recording the number of passengers leaving the carriage door of the waiting station within a certain period of time; 29, 30 often use the same video passenger flow counter; 31 (3) is a static video passenger flow counter for counting the number of passengers in the riding area, which is used to calculate the number of passengers in the riding area of a certain time, that is, the instantaneous number can be 0, 1-2 seconds, and its function is to count the instantaneous number of passengers in the riding area; 32 is the riding area computer located at the zn+1 platform, 33 is the riding area passenger counter located at the zn+1 platform; 34 is the gate and gate industrial control switch located in the entering riding area of zn+1 platform; 35 is the gate located in the leaving riding area of zn+1 platform, 36 is the display screen located at the zn+1 platform, 37 is the leaving riding area passenger counter of the zn+1 platform, 38 is the door sensor of the zn+1 platform, 39, 40 and 41 are the video passenger flow counter of the zn+1 platform, 39 (1) is the video passenger flow counter of the entering waiting carriage door of zn+1 platform; 40 (2) is the video passenger flow counter of leaving waiting carriage door of zn+1 platform; for 39 and 40, the same video passenger flow counter is often used; 41 (3) is a static video passenger flow counter for counting the number of passengers in the riding area; 42 is the riding area computer located at platform zn−1, 43 is the passenger counter in the riding area located at zn−1 platform; 44 is the gate and gate industrial control switch located in entering riding area of zn−1 platform; 45 is the gate located at leaving riding area of zn−1 platform, 46 is the display screen located at zn−1 platform, 47 is the leaving riding area passenger counter of zn−1 platform, 48 is the door sensor of zn−1 platform, 49, 50 and 51 are the video passenger counter of zn−1 platform, 49 (1) is the video passenger flow counter of the entering waiting carriage door of zn−1 platform; 50 (2) is the video passenger flow counter of the leaving waiting carriage door of zn−1 platform; for 49 and 50, the same video passenger flow counter is often used; 51 (3) is a static video passenger flow counter for counting the number of passengers in the riding area; 52 is the line computer operation control center (that is, the server includes the database), 53 is the existing line operation organization and dispatching center, referred to as the operation center, 54 is a computer and a wireless network transmission unit of the depot\parking lot, 55 is the wired network, 56 is an outbound carriage counter between the outbound carriage and the waiting carriage of the cn train, and an outbound carriage door arranged on the boundary between the outbound carriage and the waiting carriage is used for recording the number of passengers entering the waiting carriage door in a certain period of time; 57 is an entering out-of-station carriage counter between the out-of-station carriage and the waiting carriage of cn train, and the entering out-of-station carriage door set on the boundary between the out-of-station carriage and the waiting carriage is used to record the number of passengers entering the waiting carriage door in a certain period of time; the following entering and leaving carriage counters demarcate the train from the outbound carriage and the waiting carriage; 56 and 57 comprise a video passenger flow counter; 58 is the on-board computer of cn train, 59, 60 and 61 are the on-board video passenger flow counter of cn vehicle. There are 3 kinds of on-board video passenger flow counters: 59 (1) is the on-board video passenger flow counter of entering waiting carriage door; it is arranged on one side of the carriage door for recording the number of passengers entering the waiting carriage door in a certain period of time; 60 (2) is the on-board video passenger flow counter of leaving waiting carriage door; it is arranged on one side of the carriage door for recording the number of passengers of leaving waiting carriage door in a certain period of time; 59 and 60 are the same video passenger flow counter is often used; 61 (3) is a static video passenger flow counter for counting the number of passengers in the waiting carriage, which is used to calculate the number of passengers in the waiting carriage at a certain time, and its function is to count the instantaneous number of passengers in the waiting carriage; 62 is a door sensor of cn train, and the train door sensor is arranged on a carriage corresponding to a waiting carriage door; 63 is the wireless network receiving unit of a platform computer located at the zn platform, and the said wireless network receiving unit includes AP receiving end; 64 is the leaving outbound carriage counter of the on-board computer of the cn+1 train, and the leaving outbound carriage door set on the boundary between the outbound carriage and the waiting carriage is used to record the number of passengers leaving the outbound carriage door in a certain period of time; 65 is the entering outbound carriage counter of the on-board computer of cn+1 train, and the entering outbound carriage door set on the boundary between the outbound carriage and the waiting carriage is used to record the number of passengers entering the outbound carriage door in a certain period of time; 64 and 65 are the same video passenger flow counter is often used; 66 is the on-board computer of cn+1 train, 67, 68 and 69 are the on-board video passenger flow counter of cn+1 train, 67 (1) is the on-board video passenger flow counter for entering waiting carriage door; 68 (2) is the on-board video passenger flow counter of leaving waiting carriage door;

67 and 68 are the same video passenger flow counter is often used; 69 (3) is a static video passenger flow counter for counting the number of passengers in the waiting carriage; 70 is the door sensor of cn+1 train, 71 is the wireless network receiving unit of platform computer located at zn+1 platform station, 72 is the leaving outbound carriage counter of on-board computer of cn−1 train, 73 is the entering outbound carriage counter of on-board computer of cn−1 train, for 72 and 73, the same video passenger flow counter is often used; 74 is the on-board computer of cn−1 train, and 75, 76 and 77 are the on-board video passenger flow counters of cn−1 train. There are 3 kinds of on-board video passenger flow counters: 75 (1) is the on-board video passenger flow counter of the waiting carriage door; 76 (2) is the on-board video passenger flow counter of the waiting carriage door; 75 and 76 are the same video passenger flow counter is often used; 77 (3) is the static video passenger flow counter for counting the number of passengers in the waiting carriage, 78 is the door sensor of cn−1 train, 79 is the platform computer wireless network receiving unit located at the zn−1 platform station, 80 is a wireless communication system (vehicle-ground communication mode) comprises: a gate command program includes a gate instruction unit for transmitting the total number of passengers entering and leaving waiting carriage of the video passenger flow counter set in the on-board computer from the on-board computer to a server or a platform riding area computer by using a passenger information system (PIS); the instruction is calculated by the gate instruction unit; the program for correcting the number of entering passengers includes the total number of entering and leaving outbound carriage passengers using the video passenger flow counter set in the on-board computer by using the passenger information system (PIS); and the total number of passengers in the waiting range when the door is opened, the total number of passengers in the waiting carriage range when the door is closed, and the correcting number of entering passengers instruction unit transmitted to the server or the platform riding area computer; a correcting the number of entering passengers instruction unit calculates the correcting number of entering passengers instruction; the function of the door sensor or door sensing switch is to link the corresponding equipment. When the door is opened, the information of the door opening is transmitted to corresponding equipment, such as gate counters for entering and leaving riding area, counters for entering and leaving restricted carriage, counters for entering and leaving outbound carriage, static video passenger flow counters of riding area, static video passenger flow counters of restricted carriage riding area, and on-board computer and riding area computer. The function of the counter of the corresponding equipment is to start recording the number of passengers entering the restricted carriage or riding area when the door opening information of the door sensor is received, stop recording when the door closing information of the door sensor is received, and transmit the recorded number of passengers to the riding area computer or the on-board computer. When receiving the door opening information from the door sensor, the static video passenger flow counter starts to record the number of static passengers entering the restricted carriage or the riding area, and transmits the number of passengers when recording the door opening information to the riding area computer or the on-board computer. When receiving the door closing information from the door sensor, the number of static passengers entering the restricted carriage or the riding area is recorded, and the recorded number of passengers when the door is closed is transmitted to the riding area computer or the on-board computer. 81. The train forward direction.

Figure 9:
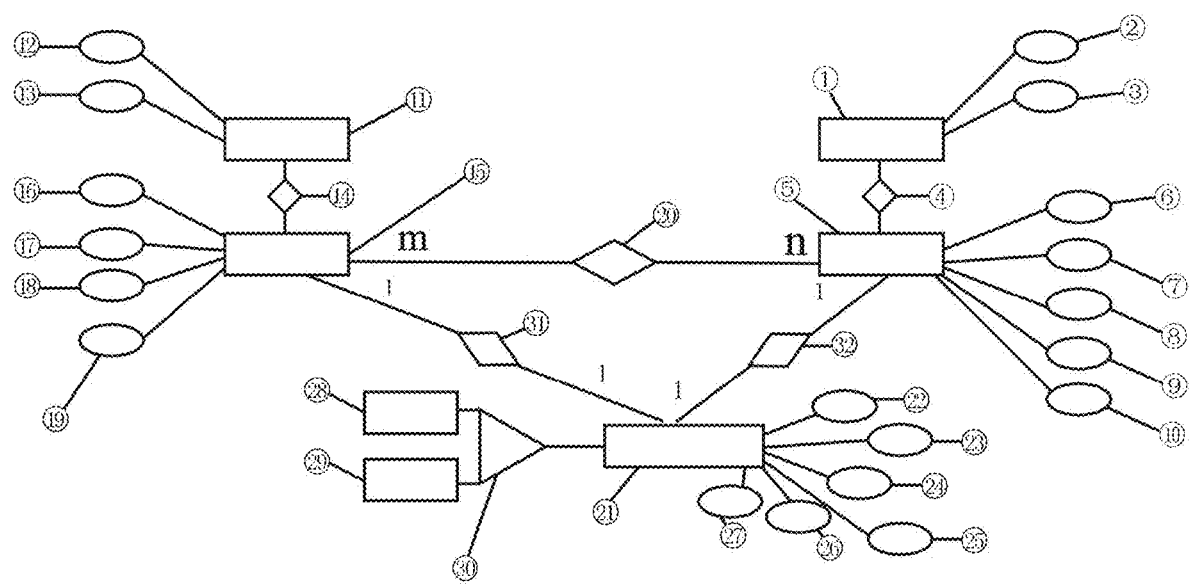

FIG. 9 is a conceptual model: an E-R model diagram: 1 is the carriage (restricted carriage, referred to as carriage) registration number; each carriage has a unique carriage registration number; A and B carriage registration numbers; mark the carriages at both ends of the train as A and B carriages; each A carriage has a unique A carriage registration number; each B carriage has a unique B carriage registration number; the main function is to avoid data redundancy and abnormal change when increasing or decreasing carriages; the operation center uploads the registration number of the newly added or withdrawn carriage to the server computing system; a carriage containing a carriage registration number stored in a non-operating state; 2 is the computer IP of the carriage registration number; the computer IP of A, B carriage registration number; set the computer communication address mark as the computer IP of the A and B carriage registration number for the A and B carriage registration number computers; it is mainly used to send the number of passengers entering and leaving the restricted carriage or the number of passengers entering and leaving outbound carriage to the server; and the computer execution system of the next riding area sends the gate instruction or the display screen instruction; 3 is the operation status is not in operation; 4 is the subordinate; the connection between the carriage registration number and the carriage number is subordinate. When the carriage with the carriage registration number is put into operation, the carriage registration number is set as the carriage number; 5 is the carriage number; the operation status is running, and the carriage number is the concept of entity set; the concept of carriage entity includes making a uniquely marked carriage number for the parking sequence of each carriage in the riding area of the big intersection road and the small intersection road; 6 is the computer IP of carriage number; when the carriage is put into operation, the server converts the computer IP of carriage registration number into the computer IP of carriage number; 7 is the train sequence; include the parking sequence for the carriage in each riding area; a train with a carriage number may stop several times in the same riding area, thus that with a carriage number may stop several times in a platform riding area, or there are several carriage sequences; 8 is the carriage registration number; each carriage is provided with a uniquely marked carriage registration number, and the following unique marks are indicated by ID; 9 is the intersection road number; each line contains ID numbers of multiple intersection roads, or ID intersection road numbers to which each carriage belongs; 10 is the stop and arrival time;

11 is the riding area registration number; each riding area has an ID riding area registration number; the main function is to increase or decrease the riding area without data redundancy and abnormal change; mark the riding areas at both ends of the platform as the registration numbers of A and B riding areas; each A riding area has an ID riding area registration number; each B riding area has an ID riding area registration number; 12 is the computer IP of the riding area registration number; set the computer communication address for the computer IP of A and B riding area registration number as the A and B riding area registration number computer; it is mainly used to send the number of passengers entering and leaving restricted carriage to the server; and the computer execution system of the next riding area sends the gate instruction or the display screen instruction; the computer execution system in the riding area accepts the gate instruction or the display screen instruction sent by the server or the carriage number computer; 13 is the operating state, and the registration number of the riding area is in the non-operating status; 14 is the subordinate; the connection between the riding area and the riding area number is subordinate. When the riding area with the registration number of the riding area is put into operation, the riding area with the registration number of the riding area is set as the riding area number; 15 is the riding area number; entity set concept, the primary key is carriage number and stopping and arrival time; make a uniquely marked riding area number for each riding area according to the natural arrangement order from the starting station to the terminal station; the riding area number comprises an uplink line and a downlink line, and the arrangement sequence of the downlink line can be a continuation of the arrangement sequence of the uplink line; 16 is the computer IP of riding area number; when the riding area is put into operation, the server converts the computer IP of riding area registration number into the computer IP of riding area number; 17 is the order of riding area; the natural arrangement order of the riding area in the same direction of the uplink and\or downlink in the whole line; 18 is the time to the riding area; the arrival time of each carriage to the riding area; 19 is the riding area registration number; it is the registration number of the riding area to which each riding area number belongs; 20 is the operation; the connection between the riding area number and the carriage number is operation; 21 is the passenger number; it is a part of the passenger group, which refers to the passenger group who rides in the restricted carriage with the same carriage sequence number and gets on and off the train in the riding area with the same riding area sequence number; the passenger number is the concept of entity set; the primary key is the time from carriage number to riding area number, riding area number and carriage number; or passenger number, for convenience and conciseness, the primary key uses passenger number; a combined primary key; Passengers who take restricted carriages with the same carriage number and get on and off train in the riding area with the same riding area number are uniformly marked as ID passenger numbers, which are mainly used to distinguish passengers who take different carriage numbers or get on and off train in different riding area numbers. That is, the passengers who get on and off train with each riding area number and each carriage number on the line are classified as ID passenger numbers; 22 is the riding area number; 23 is the carriage sequence number; 24 is the time from the carriage number to the riding area number; the error can be greater than 10 minutes and less than 10 minutes; the primary key of passengers is the time from the carriage to the riding area, 25 is the original number of passengers; the original number of passengers is the attribute of passenger number; the original number of passengers is the total number of passengers in the carriage of the passenger number before opening the door in the riding area; the primary key is the time from carriage number to riding area number, riding area sequence and carriage sequence; or passenger number; a combined primary key; or the original number of passengers of any cn carriage is the closing time when the carriage leaves in the arbitrary zn riding area, and the recorded total number of passengers entering restricted carriage plus the total existing number of passengers in the carriage before the opening of the cn carriage in the zn riding area=the original number of passengers of the next station cn+1 carriage; closing time is a time that changes from the original number of passengers in any cn carriage to the original number of passengers in the next station cn+1 carriage; 26 is the preset number; 27 is the intersection road number; 28 is the number of passengers entering restricted carriage; the primary key of the number of passengers entering restricted carriage is the time to the riding area number, the riding area sequence number and the carriage sequence number; or passenger number; the ID number of passengers entering restricted carriage is adopted as the unique mark of the number of passengers entering each restricted carriage; the data of this kind of passengers who are about to take the carriage with the same carriage number and get on train in the riding area with the same riding area number, thus the primary key of the uploaded data is the passenger number; attributes are carriage number and riding area number; 29 is the relationship between the allowable number of passengers and the passenger number is a special (IsA) relationship; the relationship between the number of passengers allowed to enter the riding area at the next station and the passenger number is a special (IsA) relationship; including the specific number of passengers allowed to enter the riding area at the next station; 30 is the relationship between the number of passengers entering the restricted carriage and the passenger number is a special (IsA) relationship; the relationship between the number of passengers entering restricted carriage and passenger numbers is a special (IsA) relationship. The primary key of the number of passengers entering restricted carriage is the time from the carriage number to the riding area number, the riding area number and the carriage number; or passenger number; a combined primary key; 31 is the passenger number have the relationship of getting on and off with the riding area number; 32 is the passenger number has the riding relationship with the carriage number.

Conceptual model: E-R model diagram is transformed into data model:

1, Carriage registration number (operation status, computer IP of carriage registration number); 2, Carriage number (riding area number, time to riding area number, carriage sequence, carriage registration number, intersection road number, computer IP of carriage number); 3, Riding area registration number (operation status, computer IP of riding area registration number); 4, Riding area number (carriage number, time to riding area number, computer IP of riding area number, riding area sequence and riding area registration number);

5, Passenger number (riding area number, carriage number, time from carriage number to riding area number, original number of passengers, preset number, number of passengers entering restricted carriage and allowable number of passengers); See Tables 1 and 3; 6, See Table 5.6 for the allowable number of passengers (riding area number, carriage number, time from carriage number to riding area number and allowable number of passengers); 7, See Table 8 for the number of passengers entering restricted carriage (riding area number, carriage number, time from carriage number to riding area number, and number of passengers entering restricted carriage);

Example 1, If a photoelectric switch is arranged in the riding area, it includes two photoelectric switches a and b, and the photoelectric switch includes an infrared photoelectric switch;

(1) The photoelectric switch a on the riding area is aligned with the body, taking the rear of the train as an example; its function is to sense the train entering or leaving the platform, and transmit the signal of the train entering or leaving the platform to the computer in the riding area or the on-board computer; (2) A photoelectric switch b is arranged at the safety door corresponding to the restricted carriage door or the upper part of the carriage door in the riding area to aim at the center joint in the door; (3) There is a motion sensor c in the restricted carriage, whose function is to sense the train starting or stopping, and transmit the signal of the train starting or stopping on the platform to the on-board computer. A motion sensor c is arranged in the restricted carriage. For example, motion sensor c and accelerometer sensor are arranged in the restricted carriage; a motion sensor includes accelerometer sensor, gyroscope sensor, magnetic sensor and so on. Among them, (1) when the accelerometer sensor stops, the stopping signal is transmitted to the on-board computer;

The accelerometer sensor c transmits the train departure (train motion) signal to the on-board computer when the train leaves the riding area while driving; the on-board computer obtains the train departure from the riding area and instructs the transmission of the total number of passengers entering restricted carriage to the instruction system.

Passenger counting unit program: (1) When the train enters the riding area, the photoelectric switch a in the riding area is blocked by the front of the train; (2) When the train stops and the door is opened, the photoelectric switch b is not blocked and obtains the signal that the door is opened; transmits the signal that the door is opened to the counter which starts counting; (3) When the door is closed, the photoelectric switch b is blocked by the door, the photoelectric switch b obtains the door closing signal, transmits the door closing signal to the counter, and the counter ends counting; and the passenger counting unit transmits the total number of passengers entering restricted carriage to the instruction system. (4) When the train leaves the riding area, the photoelectric switch a is not blocked. The photoelectric switch a obtains that the train leaves the riding area, sends a message to the instruction unit to confirm that the total number of passengers entering restricted carriage is valid, and converts the existing number of passengers in this station into the original number of passengers in the next station in the Riding Area Operation Table or Vehicle Operation Table. It is necessary to complete the recording procedure in a riding area, repeat the procedure the next time the train enters the station, and so on.

Example 2, The driving with vehicle number of 6 A and the riding area number of 8 A to the riding area number of 9 A is taken as an example.

Step 1: When the train enters the platform with the 8A riding area number, the photoelectric switch a at the corresponding position at the rear of the train with the 8A riding area number is blocked, and the train is first induced to enter; Step 2: The photoelectric switch b at the corresponding position at the center joint door of the restricted carriage on the platform of the 8A riding area number shall be blocked, and the train enters. Step 3: The passenger counting unit of the platform computer. When the train door is opened, the photoelectric switch b will not be blocked by the door. The photoelectric switch b transmits the door opening signal to the video passenger flow counter which starts to record the number of passengers entering and leaving restricted carriage.

Step 3: When the door of the restricted carriage is closed, the photoelectric switch b is blocked, the photoelectric switch b transmits the door closing signal to the video passenger flow counter which stops recording the total number of passengers; the number of passengers entering restricted carriage from the door opening time to the closing time and the total number of passengers leaving restricted carriage from the door opening time to the closing time are transmitted to the platform computer instruction system. Step 4: The instruction unit of the riding area computer of the 8A riding area number calls up the original number of passengers of the 6A vehicle number in the 8A riding area number from the stored Riding Area Operation Table of the storage unit. It is necessary to add the total number of passengers entering restricted carriage of the 6A vehicle number from the door opening time to the door closing time with the total original number of passengers to obtain the total existing number of passengers. And the gate instruction of the computer in the riding area of the next platform can be obtained. Step 5: The instruction unit of the 8A riding area number computer stores the existing number of passengers of the 6A vehicle number in the 8A riding area number into the original number of passengers of the 6A vehicle number in the 9A riding area number in the Riding Area Operation Table. The riding area computer, as 9A riding area number, calculates the original number of passengers with 6A vehicle number at 9A riding area number, which serves as the base original number of passengers for calculating the existing number of passengers with 6A vehicle number at 9A riding area number. Step 6: The instruction unit obtains the gate instruction of the next station riding area computer according to the existing number of passengers, reservation book, stop sequence and stop time, including the allowable number of passengers, and stores the allowable number of passengers in the operation table of the riding area. And it is necessary to transmit the allowable number of passengers or Table of the Number of Allowed Passengers containing the allowable number of passengers through the wireless communication unit sending subunit of the computer in the riding area to the wireless communication unit receiving subunit of the on-board computer via the wireless network; the on-board computer adds the allowable number of passengers to the allowable number of passengers in the 9 A riding area number in the on-board Table of Allowable Number of Passengers. Step 7: When the vehicle leaves, the photoelectric switch a at the rear of the train senses that it is not blocked, and the photoelectric switch a sends an instruction to the station computer to confirm that the existing number of passengers is valid. Step 8: The computer execution system of the 9 A riding area number executes the allowed multiplier issued by the gate instruction, and displays the allowable number of passengers on the display screen, so as to limit the number of passengers entering the 9 A riding area number to the maximum number of passengers. Step 9: The vehicle leaves the motion sensor of the on-board computer on the carriage with the 8A riding area number. For example, the accelerometer measures the motion of the vehicle, transmitting the vehicle starting information to the static video passenger flow counter of the waiting carriage, the passenger flow counter of entering and leaving outbound carriage, starting to modify the start of allowable number of passengers unit after 50 seconds, and recording the number of instantaneous passengers of the waiting carriage within the waiting carriage range by the static video passenger flow counter at 50 seconds; and according to the modified allowable number of passengers algorithm, the modified allowable number of passengers gate instruction and the display screen modified allowable number of passengers instruction are obtained to the computer gate execution unit of the next station riding area; if the total number of passengers in the waiting carriage is equal to the allowable number of passengers, the modified allowable number of passengers is equal to the total number of passengers leaving outbound carriage minus the allowable number of passengers; total number of passengers leaving outbound carriage=instantaneous number of passengers in waiting carriage+total number of passengers leaving outbound carriage–total number of passengers entering outbound carriage. Step 10: The passenger flow counter of entering and leaving outbound carriage starts to record the number of passengers entering outbound carriage; after 50 seconds, the total number of passengers in a waiting carriage is recorded at the first agreed time, and a gate instruction for correcting allowable number of passengers and a display screen instruction for correcting allowable number of passengers to the computer gate execution unit in the next station is obtained according to the modified allowable number of passengers algorithm; Step 11: The riding area computer execution system of the 9A riding area number executes the modified allowable number of passengers instruction issued, and displays the modified allowable number of passengers on the display screen, so as to limit the number of passengers entering the 9A riding area number within the maximum number of passengers. The total number of passengers leaving outbound carriage counting unit of the on-board computer obtains the total number of passengers leaving outbound carriage: the total number of passengers leaving outbound carriage=the number of passengers recorded by the static video passenger flow counter of the waiting carriage for 50 seconds–the number of passengers recorded by the video passenger flow counter at the upper part of leaving outbound carriage door at the first agreed time; total number of passengers leaving outbound carriage=the correcting allowable number of passengers, a correcting number of passengers instruction is obtained, and the correcting number of passengers instruction is transmitted to the computer execution system of the next station riding area, that is, the 9A riding area number. The computer execution system of the 9 A riding area number executes the correcting allowable multiplier instruction issued, and displays the correcting allowable number of passengers on the display screen, so as to limit the number of passengers entering the 9 A riding area number to the maximum number of passengers.

Example 3: The server computing unit calculates the Riding Area Operation Table of the 17A riding area (Cuizhu Station of Shenzhen Line 3) on Monday, Mar. 22, 2021; Note: The next platform of Mapianwan Station on Shenzhen Line 3 is Buji Station;

Query the database Summary Table of the Number of Passengers Entering Restricted Carriage and get the Table of the Number of Passengers Entering Restricted Carriage with 15A riding area number (log: tabulation time: Monday, Mar. 1, 2021) (Laojie Station, Shenzhen Line 3), see Table 15, table index number: 18A riding area number;

TABLE 15

16A riding area number (Buji Station, Shenzhen Line 3) Table of the Number of Passengers Entering Restricted Carriage

| Vehicle No. | Vehicle arrival sequence | Time of vehicle arriving at the platform | Routing number | Number of passengers that have entered the restricted carriage |
|---|---|---|---|---|
| C16 vehicle number | 89 | 8.00 | Big | 36 |

The table shows: (1) On Monday, Mar. 1, 2021, the vehicle number stopped in the 18A riding area number: C16 vehicle number; time for vehicles to arrive at the platform: 8.00; the number of passengers entering restricted carriage: 36;

(2) Check the form at the same time: Monday, Mar. 8, 2021, the vehicle number stopped in the 18A riding area number: C16 vehicle number; time for vehicle to arrive at the platform: 8.00; the number of passengers entering restricted carriage: 38;

(3) Check the table at the same time: Monday, Mar. 15, 2021, the vehicle number stopped in the 18A riding area number: C16 vehicle number; time for vehicle to arrive at the platform: 8.00; the number of passengers entering restricted carriage: 40;

Therefore, the vehicle number stopped in the 18A riding area number is obtained: C16 vehicle number; time for vehicle to arrive at the platform: 8.00; the number of reservations=36+38+40=38, thus if the number of reservations is 38, fill in and obtain the Riding Area Operation Table with the 15A riding area number (Mapianwan Station of Shenzhen Line 3); table index number: 15A riding area number (log: Monday, Mar. 22, 2021)

| Vehicle No. | Vehicle arrival sequence | Time of vehicle arriving at the platform | Original number of passengers | Routing number | Preset number |
|---|---|---|---|---|---|
| C16 vehicle number | 89 | 8.00 | . . . | . . . | 38 |

Example 4: An example of a database system for controlling a gate of a platform riding area includes network operation modes: a peer mode, a C\S client/server mode, a dedicated server mode and a B\S browser/server mode.

What is claimed is:

1. A database system for controlling the gate of subway riding area comprises a railway train, wherein the railway train is composed of non-restricted carriages with non-restricted number of passengers and restricted carriages with restricted number of passengers, each of the restricted carriage is a carriage with a constant maximum number of passengers, a wall or door is arranged between the non-restricted carriages and the restricted carriages for separation, the riding area for the non-restricted carriages is located in the middle of a platform, the riding area for the restricted carriages is located at one or both ends of the platform, the platform is provided with riding area entry and exit gates as well as fences to divide the platform into the riding area for the non-restricted carriages and the riding area for the restricted carriages, wherein the database system comprises:

an instruction system, an execution system and a line server; wherein the instruction system comprises a gate instruction unit that is composed of a passenger counting unit, a gate instruction subunit and a storage unit;

wherein the execution system comprises a gate control unit arranged on a computer in the riding area for the restricted carriages of the next station;

wherein the passenger counting unit is connected to the gate instruction subunit and configured to record the total number of passengers that have entered the restricted carriages from a train's arrival time to the departure time;

wherein the gate instruction subunit is configured to obtain a gate instruction based on the total number of passengers that have entered the restricted carriages from the passenger counting unit;

wherein the gate instruction unit is connected to the gate control unit arranged on the computer in the riding area for the restricted carriages of the next station and configured to transmit the gate instruction to the gate control unit arranged on the computer in the riding area for the restricted carriages of the next station;

wherein the gate control unit arranged on the computer in the riding area for the restricted carriages of the next station comprises executing the gate instruction to ensure that the number of passengers that have entered the riding area for the restricted carriages reaches up to the constant maximum number of passengers.

2. The database system for controlling the gate of the subway riding area specified in claim 1, wherein the said instruction system comprises computer arranged in the riding area, on-board computer or server.

3. The database system for controlling the gate of the subway riding area in claim 1, wherein the passenger counting unit comprises a vehicle arrival and departure sensor, a restricted carriage entry passenger counter, a restricted carriage exit passenger counter and a passenger counting subunit.

4. The database system for controlling the gate of the subway riding area in claim 3, wherein the passenger counting unit is designed to calculate the total number of passengers that have entered the restricted carriage from the time when the door opens to the time when it closes based on the number of passengers, transmitted by the restricted carriage entry passenger counter, that have entered the restricted carriage from the time when the door opens to the time when it closes as well as the total number of passengers, transmitted by the restricted carriage exit passenger counter, that have exited the restricted carriage from the time when the door opens to the time when it closes;

wherein total number of passengers that have entered the restricted carriage=the number of passengers that have entered the restricted carriage from the time when the door opens to the time when it closes−the number of passengers that have exited the restricted carriage from the time when the door opens to the time when it closes The total number of passengers that have entered the restricted carriage from the time when the door opens to the time when it closes shall be transmitted to the gate instruction subunit.

5. The database system for controlling the gate of the subway riding area in claim 3, wherein the restricted carriage entry passenger counter, the restricted carriage exit passenger counter and the passenger counting subunit include a video passenger flow counter;

the video passenger flow counter is configured to record the number of passengers that have entered the restricted carriage, the number of passengers that have exited the restricted carriage, and the total number of passengers that have entered the restricted carriage, and to transmit the total number of passengers that have entered the restricted carriage to the gate instruction subunit, and to store the number of passengers that have entered the restricted carriage in the "Table of Passengers that Have Entered the Restricted Carriage" of the storage unit; this is a video passenger flow counter-type passenger counting unit, referred to as passenger counting unit for short, which includes the video passenger flow counter connected to a door sensor.

6. The database system for controlling the gate of the subway riding area in claim 5, wherein the video passenger flow counter comprises the upper part of the platform corresponding to the parking position of the carriage door of the restricted carriage in the riding area for the restricted carriages, or the upper part of the position corresponding to the door of the restricted carriage in the carriages.

7. The database system for controlling the gate of the subway riding area in claim 1, wherein the storage unit stores the original number of passengers and the preset number;

wherein original number of passengers is the number of passengers in the restricted carriage before the door opening time of the carriage in the station, and the preset number is the preset number of passengers that will enter the riding area for the restricted carriages of the next station.

8. The database system for controlling the gate of the subway riding area in claim 1, wherein the gate instruction unit comprises a gate instruction algorithm, and the function of the said gate instruction algorithm includes a gate instruction sent to the execution system of a computer in the riding area for the restricted carriages of the next station according to the existing number of passengers and a preset number.

9. The database system for controlling the gate of the subway riding area in claim 1, wherein the storage unit stores Riding Area Operation Table or Vehicle Operation Table;

the Riding Area Operation Table includes: table index number: riding area number, and table contents: vehicle number, arrival sequence of vehicles, time of vehicle arriving at the platform, original number of passengers and preset number;

the Vehicle Operation Table includes: table index number: vehicle number, table contents: riding area number, arrival sequence of vehicles, time of vehicle arriving at the platform, original number of passengers and preset number.

10. A method for controlling a gate command algorithm for limiting the number of carriage passengers in a superplatform subway to a limit number adapt to the database system for controlling the gate of the said subway riding area specified in claim 1, wherein the preset number is the number of passengers who are allowed to enter the next riding area preset by the line server or preset according to a certain law and big data;

wherein zn platform represents any platform, and zn+1 platform represents the next continuous platform in the forward direction of any platform; cn restricted carriage represents an arbitrary restricted carriage, and cn+1 restricted carriage represents a continuous upper restricted carriage in the forward direction of the arbitrary restricted carriage, wherein the method comprises:

Step 1, when the train cn restricts the carriage from entering the zn platform, the vehicle arrival and departure sensor of the zn platform transmits the vehicle arrival signal to the upper part of the platform position corresponding to the parking of the carriage door of the restricted carriage in the riding area of the zn platform at the time of the vehicle arrival, or is set on the upper restricted carriage entry passenger counter and restricted carriage exit passenger counter of the position corresponding to the door of the restricted carriage in the carriage;

wherein the vehicle arrival and departure sensors are connected with the restricted carriage entry passenger counter and the restricted carriage exit passenger counter;

wherein the restricted carriage entry passenger counter and the restricted carriage exit passenger counter are connected with a passenger statistics subunit; it is video passenger flow counter for short;

Step 2, the video passenger flow counter of zn platform starts to count the number of passengers, Step 3, when the train leaves the zn platform, the vehicle arrival and departure sensor transmits the signal of vehicle departure to the video passenger flow counter at the time of vehicle departure, the video passenger flow counter finishes counting the number of passengers, and transmits the number of passengers in the limited carriage from the time of vehicle arrival to the time of vehicle departure to the storage unit;

Step 4, the video passenger flow counter transmits the total number of passengers entering the restricted carriage from the time of vehicle arrival to the time of vehicle departure to the gate instruction unit, which calls out the original number of passengers of the cn restricted carriage in the zn riding area from the storage unit; the gate instruction unit obtains the existing number of passengers, the existing number of passengers=the total number of passengers entering the restricted carriage from the time of vehicle arrival to the time of vehicle departure+the original number of passengers, and the gate instruction unit transmits the existing number of passengers to the original number of passengers in the cn restricted carriage of the next station $z_{n+1}$ riding area in the storage unit; as the next station $z_{n+1}$ ride area instruction unit, it calculates the base of the total number of existing passengers in the cn restricted carriage, Step 5, the gate instruction unit in the zn riding area obtains the gate instruction according to the existing number of passengers;

the gate instruction obtains the number of passengers allowed to enter the $z_{n+1}$ riding area of the next station, referred to as the allowable number of passengers, and the allowable number of passengers=the existing number of passengers−the maximum number of passengers−the preset number; the gate instruction unit transmits the gate instruction to the gate execution unit of the computer in the riding area of the next station, Step 6, the gate control unit of the computer of the next station $z_{n+1}$ riding area executes the said gate instruction for selection;

Step 7, when the number of passengers entering the riding area does not reach the allowable number of passengers, the gate entering the riding area is opened;

Step 8, when the number of passengers entering the riding area reaches the allowable number of passengers, the gate control unit closes the gate of the riding area; the purpose of controlling the number of passengers entering the restricted carriage to the limit number of passengers is achieved; and Step 9, cn restricts carriage circulates continuously in all riding areas of the whole line as above, so as to control the number of passengers entering restricted carriage on all platforms of the whole road network to the maximum number of passengers.

* * * * *